(12) United States Patent
Mundschau

(10) Patent No.: US 6,899,744 B2
(45) Date of Patent: May 31, 2005

(54) HYDROGEN TRANSPORT MEMBRANES

(75) Inventor: Michael V. Mundschau, Longmont, CO (US)

(73) Assignee: Eltron Research, Inc., Boulder, CO (US)

( * ) Notice: Subject to any disclaimer, the term of this patent is extended or adjusted under 35 U.S.C. 154(b) by 58 days.

(21) Appl. No.: 10/382,354

(22) Filed: Mar. 5, 2003

(65) Prior Publication Data
US 2003/0183080 A1 Oct. 2, 2003

Related U.S. Application Data

(60) Provisional application No. 60/362,167, filed on Mar. 5, 2002.

(51) Int. Cl.⁷ .......................... B01D 53/22; B01D 71/02; B01D 71/64

(52) U.S. Cl. .................. 95/56; 95/55; 96/10; 96/11; 96/12; 96/14

(58) Field of Search .................. 95/55, 56; 96/4, 96/7, 10–12, 14; 55/523, 524

(56) References Cited

U.S. PATENT DOCUMENTS

| | | | | |
|---|---|---|---|---|
| 2,824,620 A | * | 2/1958 | De Rosset ................. | 95/56 |
| 2,958,391 A | * | 11/1960 | Derosset .................. | 95/56 |
| 3,246,450 A | * | 4/1966 | Stern et al. .............. | 95/55 |
| 3,350,846 A | * | 11/1967 | Makrides et al. .......... | 95/56 |
| 3,393,098 A | * | 7/1968 | Hartner et al. ........... | 429/13 |
| 4,313,013 A | * | 1/1982 | Harris ................... | 585/818 |
| 4,468,235 A | * | 8/1984 | Hill ..................... | 95/46 |
| 4,496,373 A | * | 1/1985 | Behr et al. .............. | 205/354 |
| 4,536,196 A | * | 8/1985 | Harris ................... | 423/650 |
| 4,589,891 A | * | 5/1986 | Iniotakis et al. ......... | 96/11 |
| 4,689,150 A | | 8/1987 | Abe et al. ............... | 210/490 |
| 4,699,637 A | * | 10/1987 | Iniotakis et al. ......... | 96/10 |
| 4,804,475 A | * | 2/1989 | Sirinyan et al. .......... | 210/651 |
| 4,810,485 A | | 3/1989 | Marianowski ............. | 423/648.1 |
| 4,857,080 A | | 8/1989 | Baker et al. ............. | 55/16 |
| 5,139,541 A | | 8/1992 | Edlund ................... | 55/16 |
| 5,149,420 A | * | 9/1992 | Buxbaum et al. .......... | 205/219 |
| 5,171,822 A | | 12/1992 | Pater .................... | 528/188 |
| 5,215,729 A | * | 6/1993 | Buxbaum ................. | 423/248 |
| 5,217,506 A | * | 6/1993 | Edlund et al. ........... | 95/56 |
| 5,259,870 A | | 11/1993 | Edlund ................... | 95/56 |
| 5,332,597 A | | 7/1994 | Carolan et al. ........... | 427/243 |
| 5,366,712 A | | 11/1994 | Violante et al. .......... | 423/248 |

(Continued)

OTHER PUBLICATIONS

Buxbaum, R.E. and Kinney, A.B. (1996), "Hydrogen Transport through Tubular Membranes of Palladium–Coated Tantalum and Niobium," Ind. Eng. Chem. Res. 35:530–537.

(Continued)

Primary Examiner—Robert H. Spitzer
(74) Attorney, Agent, or Firm—Greenlee, Winner and Sullivan, P.C.

(57) ABSTRACT

Composite hydrogen transport membranes, which are used for extraction of hydrogen from gas mixtures are provided. Methods are described for supporting metals and metal alloys which have high hydrogen permeability, but which are either too thin to be self supporting, too weak to resist differential pressures across the membrane, or which become embrittled by hydrogen. Support materials are chosen to be lattice matched to the metals and metal alloys. Preferred metals with high permeability for hydrogen include vanadium, niobium, tantalum, zirconium, palladium, and alloys thereof. Hydrogen-permeable membranes include those in which the pores of a porous support matrix are blocked by hydrogen-permeable metals and metal alloys, those in which the pores of a porous metal matrix are blocked with materials which make the membrane impervious to gases other than hydrogen, and cermets fabricated by sintering powders of metals with powders of lattice-matched ceramic.

86 Claims, 9 Drawing Sheets

U.S. PATENT DOCUMENTS

| | | | | |
|---|---|---|---|---|
| 5,393,325 A | | 2/1995 | Edlund | 95/56 |
| 5,498,278 A | * | 3/1996 | Edlund | 96/11 |
| 5,518,530 A | | 5/1996 | Sakai et al. | 96/11 |
| 5,614,001 A | * | 3/1997 | Kosaka et al. | 96/10 |
| 5,645,626 A | | 7/1997 | Edlund et al. | 95/56 |
| 5,652,020 A | | 7/1997 | Collins et al. | 427/230 |
| 5,674,301 A | | 10/1997 | Sakai et al. | 48/61 |
| 5,738,708 A | * | 4/1998 | Peachey et al. | 95/56 |
| 5,821,185 A | | 10/1998 | White et al. | 502/4 |
| 5,931,987 A | * | 8/1999 | Buxbaum | 95/55 |
| 5,980,989 A | | 11/1999 | Takahashi et al. | 427/294 |
| 6,037,514 A | | 3/2000 | White et al. | 585/520 |
| 6,066,592 A | | 5/2000 | Kawae et al. | 502/439 |
| 6,152,987 A | * | 11/2000 | Ma et al. | 95/56 |
| 6,183,543 B1 | * | 2/2001 | Buxbuam | 96/11 |
| 6,187,157 B1 | * | 2/2001 | Chen et al. | 204/296 |
| 6,214,090 B1 | * | 4/2001 | Dye et al. | 95/56 |
| 6,235,417 B1 | | 5/2001 | Wachsman et al. | 429/17 |
| 6,281,403 B1 | | 8/2001 | White et al. | 585/658 |
| 6,296,687 B2 | | 10/2001 | Wachman | 95/55 |
| 6,350,297 B1 | * | 2/2002 | Doyle et al. | 95/55 |
| 6,379,514 B1 | * | 4/2002 | Schulte et al. | 204/429 |
| 6,461,408 B2 | * | 10/2002 | Buxbaum | 95/55 |
| 6,475,268 B2 | | 11/2002 | Thornton | 96/11 |
| 6,478,853 B1 | | 11/2002 | Hara et al. | 95/56 |
| 6,547,858 B1 | | 4/2003 | Edlund et al. | 96/4 |
| 6,569,226 B1 | * | 5/2003 | Dorris et al. | 95/56 |
| 6,572,683 B2 | * | 6/2003 | Yoshida et al. | 96/11 |
| 6,576,350 B2 | | 6/2003 | Buxbaum | 428/670 |
| 6,641,647 B2 | * | 11/2003 | Uemura et al. | 96/11 |
| 6,649,559 B2 | * | 11/2003 | Drost et al. | 502/182 |
| 2002/0020298 A1 | | 2/2002 | Drost et al. | 96/11 |
| 2002/0062738 A1 | | 5/2002 | Yoshida | 96/11 |
| 2003/0000387 A1 | | 1/2003 | Uemura | 96/11 |

OTHER PUBLICATIONS

Edlund, D.J. and Pledger, W.A. (1993), "Thermolysis of hydrogen sulfide in a metal–membrane reactor," J. Membr. Sci. 77:255–264.

Hara, S. et al. (Jul. 2002), "Hydrogen permeation through palladium–coated amorphous Zr–M–Ni (M = Ti, Hf) alloy membranes," Desalination 144:115–120.

Moss, T.S. et al. (1998), "Multilayer Membranes for Hydrogen Separation," Int. J. Hydrogen Energy 23(2):99–106.

Nishimura, C. et al. (1994), "Hydrogen permeation characteristics of vanadium–molybdenum alloys," Trans. Mat. Res. Soc. Jpn. 18B:1273–1276.

Nishimura, C. et al. (1999), "Hydrogen permeation through magnesium," J. Alloys Compounds 293–295:329–333.

Ozaki, T. et al. (Mar. 2002), "Preparation of palladium–coated V and V–15Ni membranes for hydrogen purification by electroless plating technique," Int. J. Hydrogen Energy 28:297–302.

Ozaki, T. et al. (Nov. 2003), "Hydrogen permeation characteristics of V–Ni–Al alloys," Int. J. Hydrogen Energy 28:1229–1235.

Buxbaum, R.E. et al. (1996), "Hydrogen transport and embrittlement for palladium coated vanadium–chromium–titanium alloys," J. Nucl. Mater. 233–237:510–512.*

Amandusson, H. Dissertation No. 651, "Hydrogen Extraction with Palladium Based Membranes," Institute of Technology, Linkopings Universitet, Department of Physics and Measurement Technology, Linkoping, Sweden, (Forum Scientum, Linkoping, Sweden, 2000).

Balachandran, U.; Lee, T. H.; Dorris, S. E., "Development of Mixed–Conducting Ceramic Membrane for Hydrogen Separation," In *Sixth International Pittsburgh Coal Conference,* Pittsburgh, PA, 1999.

Balachandran, U.; et al, "Development of Dense Ceramic Membranes for Hydrogen Separation," In *26th International Technical Conference on Coal Utilization and Fuel Systems:* Clearwater, FL, Mar. 5–8, 2001, pp 751–761.

Balachandran, U.; et al., "Current Status of Dense Ceramic Membranes for Hydrogen Separation," In *27th International Technical Conference on Coal Utilization and Fuel Systems:* Clearwater, FL, Mar. 3–7, 2002, pp 1155–1165.

Balachandran, U.; et al., M. "Development of mixed–conducting oxides for gas separation," *Solid State Ionics* 1998, 108, 363–370. 37.

Balachandran, U.; et al., "Development of Mixed–Conducting Dense Ceramic Membranes for Hydrogen Separation," In *Proceedings of the Fifth International Conference on Inorganic Membranes:* Nagoya, Japan, 1998.

Benziger, J. B. (1991) "Thermochemical Methods for Reaction Energetics on Metal Surfaces," in: Metal–Surface Reaction Energetics, Edited by E. Shustorovich, (VCH Publishers, Weinheim, Germany) pp. 53–107.

Beshers, D. N. (1973) "Diffusion of Interstitial Impurities," in: "Diffusion," (American Society for Metals, Metals Park, Ohio) pp. 209–240.

Bonanos, N.et al., "Ionic Conductivity of Gadolinium–Doped Barium Cerate Perovskites," *Solid State Ionics* 1989, 35, 179–188.

Bonanos, N. "Transport properties and conduction mechanism in high–temperature protonic conductors," *Solid State Ionics* 1992, 53–56, 967–974.

Bonanos, N. "Transport Study of the Solid Electrolyte $BaCe_{0.9}Gd_{0.1}O_{2.95}$ at High Temperatures," *J. Phys. Chem. Solids* 1993, 54, 867–870.

Bonanos, N.et al. "Perovskite solid electrolytes: Structure, transport properties and fuel cell applications," *Solid State Ionics* 1995, 79, 161–170.

Buxbaum, R. E.; Marker, T. L., "Hydrogen transport through non–porous membranes of palladium–coated niobium, tantalum and vanadium," *J. Mem. Sci.* 1993, 85, 29–38.

Chary, A. S.; Reddy, S. N. "Effect of Structural Changes on DC Ionic Conductivity of Rubidium Nitrate Single Crystals," *Phys. Stat. Sol.* 1998, 208, 349–352.

Heed, B. et al., "Proton conductivity in fuel cells with solid sulphate electrolytes," *Solid State Ionics* 1991, 46, 121–125.

Heinze, S.; et al., "Relation between grain size and hydrogen diffusion coefficient in an industrial Pd–23% Ag alloy," *Solid State Ionics* 1999, 122, 51–57.

Iwahara, H.; et al., "Proton Conduction in Sintered Oxides and its Application to Steam Electrolysis for Hydrogen Production," *Solid State Ionics* 1981, 3/4, 359–363.

Iwahara, H.; et al., "Proton Conduction in Sintered Oxides Based on $BaCeO_3$," *J. Electrochem. Soc.* 1988, 135, 529–533.

Iwahara, H.; et al., "High Temperature Solid Electrolyte Fuel Cells Using Perovskite–Type Oxide Based on $BaCoO_3$," *J. Electrochem. Soc.* 1990, 137, 462–465.

Iwahara, H.; et al., "High–temperature $C_1$–gas fuel cells using proton–conducting solid electrolytes," *J. Appl. Electrochem.* 1989, 19, 448–452.

Iwahara, H. "Oxide–ionic and protonic conductors based on perovskite–type oxides and their possible applications," *Solid State Ionics* 1992, 52, 99–104.

Iwahara, H. et al., "An electrochemical steam pump using a proton conducting ceramic," *J. Appl. Electrochem.* 1996, 26, 829–832.

Kreuer, K. D. et al., "H/D isotope effect of proton conductivity and proton conduction mechanism in oxides," *Solid State Ionics,* 1995, 77, 157–162.

Kreuer, K. D. "On the development of proton conducting materials for technological applications," *Solid State Ionics* 1997, 97, 1–15.

Kroger, F. A. "Detailed Description of Crystalline Solids; Imperfections," *The Chemistry of Imperfect Crystals;* Chapter 7, North Holland Publishing Co.: Amsterdam, 1964, pp 192–207.

Lee, W.; Nowick, A. S. "Protonic Conduction in Acceptor–Doped $KTaO_3$ Crystals," *Soldi State Ionics* 1986, 18/19, 989–993.

Liang, K. C.; Nowick, A. S. "High–temperature protonic conduction in mixed perovskite ceramics," *Solid State Ionics* 1993, 61, 77–81.

Lunden, A.; Mellander, B.–E.; Zhu, B. "Mobility of Protons and Oxygen Ions in Lithium Sulfate and Other Oxyacid Salts," *Acta. Chem. Scand.* 1991, 45, 981–982.

Munch, E.; et al., "A quantum molecular dynsmics study of proton conduction phenomena in Ba $CeO_3$,"*Solid State Ionics* 1996, 86–88, 647–652.

Munch, W. et al. J. "A quantum molecular dynamics study of the cubic phase of $BaTiO_3$ and $BaZrO_3$," *Solid State Ionics* 1997, 97, 39–44.

Nishimura, C. et al., "Hydrogen Permeation Characteristics of Vanadium–Nickel Alloys," M. *Mat. Trans.* 1991, 32, 501–507.

Nishimura, C. et al., "V–Ni alloy membranes for hydrogen purification," *J. Alloys and Compounds* Jan. 2002, 330–332, 902–906.

Norby, T.; Larring, Y. "Mixed hydrogen ion–electronic conductors for hydrogen permeable membranes," *Solid State Ionics* 2000, 136–137, 139–148.

Norby, T.; Larring, Y., "Concentration and Transport of Protons and Oxygen Defects in Oxides," In *Ceramic Oxygen Ion Semiconductors and Their Applications;* Steele, B. C. H., Ed.; The Institute of Materials, 1996, pp 83–93.

Norby, T., "Proton Conduction in Oxides," *Solid State Ionics* 1990, 40/41, 857–862.

Peachey, N. M. et al., "Composite Pd/Ta metal membranes for hydrogen separation," *J. Mem. Sci.* 1996, 111, 123–133.

Shima, D.; Haile, S. M. "The influence of cation non–stoichiometry on the properties of undoped and gadolinia–doped barium cerate," *Solid State Ionics* 1997, 97, 443–445.

Siriwardane, R. V. Jr., et al., "Characterization of ceramic hydrogen separation membranes with varying nickel concentrations," *Appl. Surf. Sci.* 2000, 167, 34–50.

Stenzenberger, H.D., "Addition Polyimides," in: Advances in Polymer Science—High Performance Polymers, vol. 117; Edited by P.M. Hergenrother, (Springer–Verlag Berlin Heidelberg, 1994), pp. 165–220.

Takekoshi, T., "Synthesis of Polyimides," (1996) *Polyimides Fundamentals and Applications,* Chapter 2, (Marcel Dekker, Inc., New York, New York), pp. 7–44.

Van der Merwe, J.H. (1984) "Recent Developments in the Theory of Epitaxy," in: "Chemistry and Physics of Solid Surfaces V," Edited by R. Vanselow and R. Howe, Springer–Verlag, Berlin, 1984) pp. 365–401.

Yajima, T.; Iwahara, H. "Studies on behavior and mobility of protons in doped perovskite–type oxides: (I) In situ measurement of hydrogen concentration in $SrCe_{0.95}Yb_{0.05}O_3$ at high temperature," *Solid State Ionics* 1992, 50, 281–286.

Yajima, T. et al. "Proton conduction in sintered oxides based on $CaZrO_3$," *Solid State Ionics* 1991, 47, 271–275.

Yamakawa, K. et al., "Hydrogen permeability measurement through Pd, Ni and Fe membranes," *J. Alloys and Compounds* May 2001, 321, 17–23.

Zhang, Y. et al., "Hydrogen permeation characteristics of vanadium–aluminium alloys," *Scripta Materialia* Nov. 2002, 47, 601–606.

Zhu, B.; Mellander, B.–E. "Proton conduction in salt–ceramic composite systems,"*Solid State Ionics* 1995, 77, 244–249.

Zhu, B.; Mellander, B.–E. "Proton Conducting Composite Materials at Intermediate Temperatures," *Ferroelectrics* 1995, 167, 1–8.

Zhu, B. et al. "Structure and ionic conductivity of lithium sulphate–aluminum oxide ceramics," *Solid State Ionics* 1994, 70/71, 125–129.

Zhu, B. Solid State Ionics 1999, "Intermediate temperature proton conducting salt–oxide composites," 125, 397–405.

Zhu, B.; Mellander, B.–E., "Ionic Conductivities of Nitrate–Based Oxide Materials for Solid State Fuel Cells," In *High Temperature Electrochemical Behavior of Fast Ion and Mixed Conductors;* Poulsen, F. W., Bentzen, J. J., Jacobson, T., Skou, E., Ostergard, M. J. L., Eds.: Roskilde, 1993, p 495.

Zhu, B.; Mellander, B.–E. "Proton conducting materials based on hydrofluotides," J. Mat. Sci. Lett. 2000, 19, 971–973.

Zhu, B. "Applications of hydrofluotide ceramic membranes for advanced fuel cell technology," Int. J. Energy Res. 2000, 24, 39–49.

Zhu, B. et al. "Intermediate temperature fuel cells using alkaline and alkaline earth fluoride–based electrolytes," Solid State Ionics 2000, 135, 503–512.

* cited by examiner

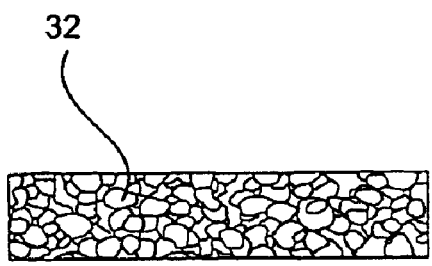
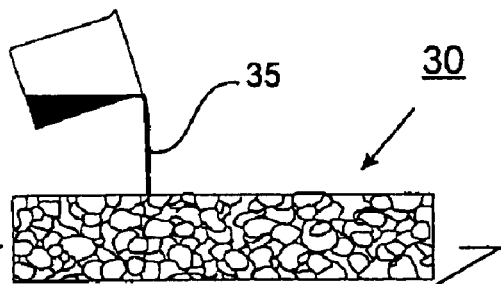
FIG. 3A    FIG. 3B
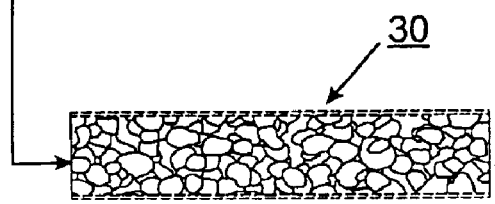
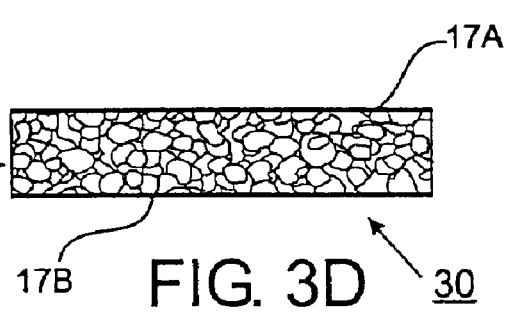
FIG. 3C    FIG. 3D

HYDROGEN TRANSPORT MEMBRANES

CROSS-REFERENCE TO RELATED APPLICATIONS

This application takes priority under 35 U.S.C. 119(e) to U.S. provisional application Ser. No. 60/362,167, filed Mar. 5, 2002, which is incorporated in its entirety by reference herein.

STATEMENT REGARDING FEDERALLY-SPONSORED RESEARCH

This invention was made with United States government support awarded through DOE National Energy Technology Laboratory Contract No. DE-FC26-OONT40762. The United States government has certain rights in this invention.

BACKGROUND OF THE INVENTION

The present invention relates to hydrogen-permeable membranes, which separate hydrogen from mixtures of gases by allowing selective diffusion of hydrogen through the membrane while substantially blocking the diffusion of other components in the gas mixtures. In addition, this invention relates to methods of producing dense hydrogen-permeable membranes, methods of mechanically supporting thin hydrogen-permeable films and methods of re-enforcing membrane materials which are embrittled by hydrogen. The invention also relates to membrane reactors for hydrogen separation employing the membranes of this invention and to methods for separating hydrogen using these membranes.

Hydrogen can serve as a clean fuel for powering many devices ranging from large turbine engines in integrated gasification combined cycle electric power plants, to small fuel cells. Hydrogen can also power automobiles, ships and submarines and can be used as heating fuel. Large quantities of hydrogen are used in petroleum refining. In chemical industry, membranes, which are selectively permeable to hydrogen are expected to be useful in the purification of hydrogen and also to shift chemical equilibrium in hydrogenation or de-hydrogenation reactions or in the water-gas shift reaction. Membranes are used by the semiconductor industry for production of ultra-high purity hydrogen. The nuclear industry uses membranes for separation of hydrogen isotopes from isotopes of helium and other components of plasmas.

Methods of producing hydrogen include steam reforming or partial oxidation of natural gas, petroleum, coal, biomass, and municipal waste. Production of hydrogen from these sources is accompanied by production of carbon dioxide, carbon monoxide, and other gases. It is highly desired to separate hydrogen from the unwanted side-products and gaseous contaminants. Use of hydrogen permeable membranes is one means for separating hydrogen from complex gas mixtures.

U.S. Pat. No. 2,824,620 (de Rossett) relates to hydrogen-permeable membranes formed from a layer or film of hydrogen-permeable membrane on certain porous support matrices. In related U.S. Pat. No. 2,958,391 (de Rosset) the hydrogen-permeable membrane is formed using a support matrix of sintered metal particles. U.S. Pat. No. 3,350,846 (Makrides, et al.) reports hydrogen-permeable membranes formed from Group VB metal foils coated on both sides with palladium catalysts.

U.S. Pat. No. 4,536,196 (Harris) relates to a hydrogen diffusion membrane which is palladium or a palladium alloy coated with at least one metal selected from Group IB, IVB, VB and VIB of the Periodic Table. The coating is reported to increase resistance of the palladium or palladium alloy to poisoning. U.S. Pat. No. 4,313,013 (Harris) relates to a hydrogen diffusion membrane of palladium or certain palladium alloys that has been treated with silane and/or silicon tetrafluoride. The treatment is reported to deposit a film of elemental silicon to prevent poisoning of the metal or alloy and extend its use before regeneration is required.

U.S. Pat. No. 4,468,235 (Hill) relates to separation of hydrogen from other fluids employing a hydrogen-permeable coated alloy at a temperature between about 100–500° C. The alloy reported is a titanium alloy comprising 13% by weight vanadium, 11% by weight chromium and 3% by weight aluminum stabilized in the body-centered cubic crystalline form. At least one surface of the alloy is coated with a metal or alloy "based on" palladium, nickel, cobalt, iron, vanadium, niobium, or tantalum.

U.S. Pat. No. 4,496,373 relates to a hydrogen diffusion membrane that is a non-porous hydrogen-permeable metallic membrane provided with a coating of an alloy of palladium with at least 45 atomic % Cu or at least 50 atomic % Ag or at least 7 atomic % Y. The membrane contains Cu, Ag or Y in a concentration at least equilibrated with the coating at operational temperature.

U.S. Pat. No. 4,589,891, Iniotakis et al., reports hydrogen-permeable membranes formed by galvanic deposition of metals with high hydrogen permeability onto fine mesh metal fabric. High permeability metals are said to include Nb, Ta, V, Pd and Zr. Palladium and its alloys are said to be preferred because they are resistant to the formation of hydrides and to surface oxidation. A thin metal layer, 1 to 20 microns thick, particularly of palladium and palladium silver alloys is formed on fine metal wire mesh. The metal of the wire mesh is not specified. The patent also reports membranes formed by thin layers of hydrogen-permeable metal sandwiched between two fine metal mesh screens which provide mechanical support. The authors reported that fine metal mesh were superior to porous metals as mechanical supports for thin films of palladium and palladium alloys. Related U.S. Pat. No. 4,699,637, Iniotakis et al., reports hydrogen-permeable membranes formed by sandwiching a layer or foil of a hydrogen-permeable metal between two fine metal meshes to provide mechanical support.

U.S. Pat. No. 5,738,708, Peachey, et al., reports a composite metal membrane for hydrogen separation in which a layer of Group IVB metals or Group VB metals is sandwiched between two layers of an oriented metal layer of palladium, platinum or alloys thereof. The oriented metal layer is referred to as the "catalyst" layer. The membrane is exemplified by one formed by metal evaporation (Pd) onto a tantalum foil. Additionally, optional buffer layers of certain oxides and sulfides are reported to reduce interdiffusion of the metals. Related U.S. Pat. No. 6,214,090 (Dye and Snow) reports that palladium, platinum, nickel, rhodium, iridium, cobalt and alloys thereof can be used as the outermost catalytic layers of the hydrogen transport membrane. They also report the use of a diffusion barrier which includes non-continuous layers of metal chalcogenides between the core metal and catalyst layers.

U.S. Pat. No. 5,149,420 (Buxbaum and Hsu) reports methods for plating Group IV and VB metals, in particular niobium, vanadium, zirconium, titanium and tantalum, with palladium from aqueous solution to form membranes for hydrogen extraction. The metal to be plated is first roughened and electrolytically hydrided before plating. Related U.S. Pat. No. 5,215,729 (Buxbaum) reports a membrane for hydrogen extraction consisting essentially of a thick first layer of refractory metal or alloy that is permeable to hydrogen and a second layer coated over the first layer consisting essentially of palladium, alloys of palladium, or platinum. Refractory metals are said to include vanadium, tantalum, zirconium, niobium and alloys including alloys said to be non-hydrogen embrittling. Alloys specifically stated in the patent to be non-hydrogen embrittling are: "Nb 1% Zr," "Nb 10 Hf 1 Ti," Vanstar(Trademark) and "V15Cr5Ti."

U.S. Pat. No. 5,931,987 (Buxbaum) reports an apparatus for extracting hydrogen from fluid streams containing hydrogen which has at least one extraction membrane. The patent also reports an extraction membrane consisting essentially of a layer of Pd—Ag or Pd—Cu alloy or combinations thereof one of the surfaces of which is coated with a layer consisting essentially of palladium, platinum, rhodium and palladium alloys. U.S. Pat. No. 6,183,543, which is a continuation-in-part of U.S. Pat. No. 5,931,987(Buxbaum) also relates to an apparatus for extracting a gas, particularly hydrogen, from a fluid stream using plate membranes. The patent reports that extraction membranes can have a substrate layer of certain specified alloys: Ta—W, V—Co, V—Pd, V—Au, V—Cu, V—Al, Nb—Ag, Nb—Au, Nb—Pt, Nb—Pd, V—Ni—Co, V—Ni—Pd, V—Nb—Pt or V—Pd—Au with an outer catalyst layer of palladium, platinum, rhodium and palladium alloy. Preferred outer catalysts were stated to include Pd—Ag alloys with compositions between Pd-20% Ag and Pd-50% Ag, alloys of Pd-40% Cu, and Pd-10% Pt.

U.S. Pat. Nos. 5,139,541; 5,217,506; 5,259,870; 5,393,325; and 5,498,278 (all of Edlund) relate to non-porous hydrogen-permeable composite metal membranes containing an intermetallic diffusion barrier separating a hydrogen-permeable base metal and a hydrogen-permeable coating metal. In U.S. Pat. Nos. 5,139,541 and 5,217,506 the intermetallic diffusion barrier is described as a thermally stable inorganic proton conductor. A proton conductor is broadly defined therein to include $H^+$ ion conducting materials and any material that shows complex ion motion at high temperatures such as the oxides and sulfides of molybdenum, silicon, tungsten and vanadium. In U.S. Pat. No. 5,217,506, specific uses for the hydrogen transport membranes which include decomposition of hydrogen sulfide and extraction of hydrogen from a water-gas shift mixture of gases are discussed. U.S. Pat. No. 5,259,870 reports the use of oxides of aluminum, lanthanum and yttrium as the diffusion barriers. U.S. Pat. No. 5,393,325 reports a composite metal membrane in which an intermediate layer is positioned between the base metal and a coating metal which intermediate layer does not form a thermodynamically stable hydrogen impermeable layer at temperatures ranging from about 400° C. to about 1000° C. The intermediate layer is said not to be a pure metal or metal alloy. The base metal is said to be selected from the metals of Group IB, IIIB, IVB, VB, VIIB and VIIIB and hydrogen-permeable lanthanides and alloys. The intermediate layer is said to include not only various oxides and sulfides, but also carbides, nitrides, borides, fluorides, zeolites, graphite and diamond.

U.S. Pat. No. 5,498,278 (also of Edlund) reports the use of a flexible porous intermediate layer between a rigid support layer and a nonporous hydrogen-permeable metal coating layer or the use of a textured metal coating layer to form a composite hydrogen-permeable inorganic membrane. The support layer is said to include a wide range of materials including "dense hydrogen-permeable metals, porous, perforated and slotted metals," and "porous, perforated and slotted ceramics." It is stated that it is key to accommodating dimensional change that a flexible non-sintered intermediate layer be provided or that a textural coating layer be employed. The intermediate layer is also said to prevent intermetallic diffusion between the support matrix and the coating metal layer. In all of the Edlund patents, interdiffusion between the base metal layer and the coating layer is mentioned as a problem that is solved by introduction of the intermetallic diffusion barrier or the intermediate layer. This implies that the coating layer and the support or base layer of the membrane would be made of different materials. These patents do not teach or suggest the use of base metal layers and coating layers made of the same metals to eliminate metallic interdiffusion problems. Ceramic monoliths with honeycomb-like cross section are also reported as supports for coating layers.

The scientific literature relating to hydrogen transport membranes is extensive, especially concerning membranes of palladium and it alloys, some of which are available commercially. However, the prior art does not attempt to lattice match the metal membrane material with the material of the mechanical support. In specific embodiments of this invention, lattice matching is used to minimize interfacial strain and membrane failure due to initiation of cracks and provide improved hydrogen-permeable membranes.

SUMMARY OF THE INVENTION

This invention provides composite membranes and methods for production of composite membranes, which are designed for separation of hydrogen from mixtures of gases. These membranes are particularly useful for separating hydrogen from water-gas-shift reaction mixtures containing $H_2$, CO, $CO_2$, $N_2$, $H_2S$, $NH_3$, $H_2O$ or other gases, but are not limited to this mixture or this use. In general, it is desired to use metals and metal alloys which have the highest permeability for hydrogen, but which have negligible permeability for most other gases. Preferred metals include V, Nb, Ta, Zr, Pd, Ni, Fe, Mo and their alloys. More preferred metals are V, Nb, Ta, Zr, Pd, and their alloys. Yet more preferred metals are V, Nb, Ta, Zr and their alloys. In order to maximize flux of hydrogen across a membrane, it is highly desirable to minimize the thickness of the hydrogen-permeable metal layer (or component), while at the same time avoiding the formation of cracks, tears, or holes which provide leak pathways for undesired gases. The invention provides improved membranes in which hydrogen-permeable metals and metal alloys are mechanically supported and methods for mechanically supporting metals and metal alloys.

In one general embodiment, a porous material is fabricated as the mechanical support or carrier, and the pores of the support material are then blocked by a thin layer of a metal or alloy which is permeable to hydrogen (See FIGS. 1 and 2). The porous support is designed so that diffusion of hydrogen occurs rapidly through the pores. The porous support is fabricated from material which is preferably lattice matched (as discussed herein) to the hydrogen permeable metal and is thermally and chemically compatible with the desired application of the membrane and the temperature and pressure employed during hydrogen separation. The porous support materials may also be designed to have catalytic capability for adsorption and dissociation of molecular hydrogen, or for bulk diffusion of hydrogen. The support material can include porous ceramic, porous catalytic materials (e.g., $Fe_3O_4$, $Fe_3O_4/Cr_3O_4$ (90/10 wt %)); porous metals(including alloys) and other porous materials appropriate for the selected membrane application, such as porous organic polymers, e.g., porous organic resins.

In an exemplary embodiment, the porous support material is a metal or alloy of the same composition as the hydrogen-permeable thin metal layer. The thin metal layer is applied to the porous metal or alloy support as a foil, or the thin layer may be deposited onto the porous support by sputtering, evaporation, chemical vapor deposition, by electroless deposition, or by other means. The porous metal or metal alloy support is significantly thicker than the hydrogen-permeable thin metal layer. In general, the hydrogen-permeable metal (or alloy) layers are as thin as possible to enhance hydrogen-permeability, but thick enough to prevent pinhole leaks. For example, the thin hydrogen-permeable metal (or alloy) layer can generally range in thickness from about 200 nm to about 150 microns. When V, Nb, Ta, or Zr (or alloys thereof) are used, hydrogen-permeable layer thicknesses over this entire range can be used because of the relatively higher permeability of these metals and alloys. In contrast, when palladium and its alloys are used for the thin hydrogen-permeable layer, layer thicknesses in the range of 200 nm to about 20 microns are preferred for use because of their relatively poorer permeability and the expense of using these materials. When a metal or alloy foil is employed as the thin hydrogen permeable layer, its thickness will be generally thicker than a deposited layer. The thickness needed to prevent pinholes in the composite membranes also depends upon the size of the pores in a porous support (coarser pores (>1 micron) will require thicker hydrogen-permeable layers compared to finer pores (<1 micron)). The support metal (or other material) should be sufficiently thick to resist applied differential pressure, but sufficiently thin so as not to significantly reduce hydrogen flux. The thickness of the support material in general will depend upon the type of material employed. Preferred support thickness can range from about 100 microns to more than about 500 microns.

In the case of foils, a catalyst for the dissociation of hydrogen may be applied to the foil before application to the porous support. The foils can be coated on one or both sides with catalysts before positioning on a porous support.

In another general embodiment, a porous support matrix of a hydrogen permeable metal or alloy is fabricated first by sintering together powder of the metal or metal alloy. The pores of the porous metal matrix are then blocked to render the membrane impervious to gases other than hydrogen (See FIG. 3.) In a specific example, the pores of the sintered support metal are blocked using an organic resin which is not permeable to hydrogen. In another specific embodiment, the pores are blocked using a metal or alloy which may be hydrogen-permeable or non-hydrogen-permeable. Specifically, porous V, Nb, Ta, Zr, or Pd or alloys thereof are sintered and the pores of the sintered metal or alloy are blocked by hydrogen permeable materials such as V, Nb, Ta, Zr, Pd or alloys thereof. Pores can be blocked by deposition of a layer of metal or alloy in the pores or by positioning and attaching a metal or alloy foil to block the pores. In these membranes, permeation of hydrogen is mediated through both the metal (or alloy) matrix and through the thin hydrogen permeable metals blocking the pores.

In another general embodiment, powders of hydrogen-permeable metals and alloys are mixed with powders of ceramic and sintered together to form dense cermets (See FIG. 4). In this embodiment, the amount of hydrogen-permeable metal or alloy in the cermet is selected to render the membrane hydrogen-permeable. It is believed that to exhibit a practically useful level of hydrogen-permeability that the metal and ceramic form continuous matrices through the cermet. More specifically, it is preferred that the amount of hydrogen-permeable metal or alloy in the cermet ranges from about 40 vol. % to about 60 vol. %. The ceramic component of the cermet can be derived from one or more metal oxides, metal carbides, metal borides or metal nitrides. In a specific embodiment, the cermet comprises a hydrogen-permeable metal or alloy and a ceramic, such as certain perovskites which can itself exhibit hydrogen permeability. The ceramic component of the cermet and the metal or alloy component of the cermet are preferably selected to maximize lattice matching.

In yet another general embodiment, thin foils of hydrogen-permeable metal are coated with a ceramic adhesive or paste, which sets to form a rigid, porous support. The thickness of the support is selected to provide sufficient support for the thin foil to enhance useful lifetime of the membrane without significantly inhibiting hydrogen permeation. In particular the ceramic layers can range in thickness from about 100 microns to about 500 microns. Alternatively, hydrogen-permeable metal or alloy foils can be coated on either side with an organic resin to provide a porous support for the hydrogen-permeable foil.

For each of the general embodiments except those which employ an organic resin, it is preferred to lattice match the hydrogen-permeable metal or metal alloy with its support or carrier material in order to produce coherent interfaces between the metal and support. Lattice matching minimizes stress at the internal interfaces, thus reducing the formation of dislocations, leak paths, and sites for initiation of cracks. In many cases it is preferred to add a catalyst for the dissociation of hydrogen onto one or both sides of the membrane. The hydrogen permeable metal or metal alloy can be latticed-matched to a porous metal or alloy support, a porous ceramic support or a porous cermet support. For organic polymers and resins which are not crystalline, lattice matching does not apply to composite membranes in which an organic resin is employed as a porous support for a thin layer of hydrogen-permeable metal or alloy or to composite membranes in which an organic resin is employed to block the pores of a porous matrix of hydrogen-permeable metal or alloy.

In a more specific embodiment, a hydrogen-permeable membrane of this invention comprises a porous carrier, particularly a ceramic carrier, in which the pores are at least in part blocked with a substantially metallic layer. The porous carrier is thereby rendered impermeable to gases other than hydrogen. The porous carrier is typically significantly thicker than the metallic layer in the pores of the carrier or the metallic layer coating the porous support. Preferably the membrane ranges in thickness from about 0.1 mm to about 5 mm.

In general, the membrane support structure is made to be sufficiently thick to withstand the pressure gradient applied in a given application, for example, a pressure gradient of between about 0.5 to 100 bar (and more typically about 15 to about 70 bar) is applied in hydrogen separations and related applications. The metallic layer is preferably less than about 20 micron thick in the case of palladium and its alloys, and less than about 150 microns thick in the cases of V, Nb, Ta, and Zr and their alloys. In general, the metallic layer is as thin as possible to maximize diffusion of hydrogen, but sufficiently thick to prevent the formation of holes which allow diffusion of gases other than hydrogen. In preferred embodiments the porous carrier comprises a catalyst for the dissociation of molecular hydrogen, although the catalyst may also be applied to both sides of the metallic layer. The substantially metallic layer blocking the pores of the carrier comprises a metal or metal alloy that functions for diffusion of hydrogen through the membrane. The term alloy is used broadly herein to refer to a mixture of two or more different metals and includes its generally accepted meaning in the art. A metallic layer comprising two or more metals may have a homogeneous composition throughout the metallic layer or may be heterogeneous with islands of one metal separating from the other metal or metal alloy.

The metallic layer may be a single layer comprising one or more metals (including alloys) or it may be a composite layer which has two or more layers of different metals, different mixtures of metals or different alloys. Preferred metallic layers are composed of metals and alloys, particularly V, Nb, Ta, Zr, Pd and alloys thereof. A substantially metallic layer may contain metal oxides, or carbides, particularly at the interfaces of the metallic layer.

In principle, the porous carrier can be any porous ceramic or other refractory material and can also be a porous metal or metal alloy carrier. When the carrier is itself a metal or metal alloy, the metallic layer introduced into the pores of the carrier or atop the carrier can be the same metal or metal alloy as the carrier. The carrier material and any substrate material employed in the membrane should resist decomposition and poisoning under the reaction conditions of the application in which it is employed, e.g., it should withstand reducing conditions. Carrier materials must be stable under the reactor conditions that are to be applied, for example, hydrogen separation from water-gas shift reactors is preferably performed at temperatures between about 200–500° C. Preferred carrier ceramics, metals and alloys are selected to maximize lattice match with the metal or metal alloys used to block pores to minimize dislocations and leak paths for gases other than hydrogen. The carrier material preferably possesses catalytic ability to dissociate hydrogen molecules into atoms. Alternatively, a hydrogen dissociation catalyst can be provided as separate layers or films on the surface of the membrane in contact with the hydrogen source and hydrogen sink.

In specific embodiments, the hydrogen transport membranes of this invention comprise a porous ceramic, in which the pores are at least in part blocked with a substantially metallic layer. The porous ceramic is thereby rendered impermeable to gases other than hydrogen. In preferred embodiments the porous ceramic comprises or contains a catalyst for the dissociation of molecular hydrogen. The substantially metallic layer blocking the pores of the ceramic comprises a metal or metal alloy that functions for diffusion of hydrogen through the membrane. Preferred size of the pores for the membrane of this invention ranges from about 0.1 micron to about 20 microns.

The porous carrier, e.g., the porous ceramic, with pores blocked by the substantially metallic layer can itself be supported by a substrate having substrate pores substantially larger than the pores of the ceramic onto which the metallic layer is introduced. Again membranes comprising substrate, imbedded carrier and imbedded substantially metallic layer preferably range in thickness from about 0.1 mm to about 5 mm.

In a specific embodiment, the porous carrier, including ceramic, metal or metal alloy carriers, onto which the metallic layer is introduced and the metal or metal alloy to be introduced onto the carrier are selected such that the lattice constants of the carrier material and those of the metal or metal alloy to be introduced are substantially matched to provide a good epitaxial/endotaxial fit.

Hydrogen transport membranes of this invention in which lattice matching is used to select components exhibit significantly improved mechanical strength compared to membranes in which the lattice constants of the two components are not substantially matched. For purposes herein, the term substantially matched means that the lattice constants of the porous carrier material and the metal or metal alloy to be introduced into the carrier are matched to within about 15% of each other. In preferred embodiments, the lattice constants of the two materials are matched to within about 10% of each other and in more preferred embodiments the lattice constants are matched to within about 5% of each other. It is most preferred that the lattice constants are matched to within about 1–2% of each other. Examples of materials that are very well latticed matched include V/α-alumina, Nb/α-alumina, Ta/α-alumina, Mo/α-alumina, Pd/$La_{1-x}Sr_xCoO_{3-z}$ and Pd/$LaFe_{1-y}Cr_yO_{3-z}$ as well as combinations in Table 4.

If the metal layer and porous substrate or carrier are made of identical metal or metal alloy, lattice constants, are in principle identical. In general, it is preferred to select materials for the composite membrane to maximize lattice matching to decrease mechanical stress. However, the use of materials (ceramic and metal) the lattice constants of which are less well matched may be beneficial to improve other properties of the membrane, for example, in cases where the porous layer is designed to possess catalytic properties for hydrogen dissociation.

Hydrogen-permeable membranes transport hydrogen from a hydrogen source to a hydrogen sink and have two surfaces: a first surface facing the hydrogen source and a second surface facing the hydrogen sink. Hydrogen is absorbed and dissociated at the first surface, transported across the membrane and desorbed at the second surface. The hydrogen transport membranes of this invention can be made in any size (e.g., length, width or diameter), thickness, or shape that facilitates hydrogen transport from the hydrogen source to the sink and which retains mechanical stability under the conditions (e.g., temperature and pressure), including flat plates, undulating plates, tubes, and one-open-ended tubes.

The first membrane surface facing the hydrogen source provides for absorption and dissociation of hydrogen molecules into a dissociated form of hydrogen (i.e. hydrogen atoms, protons or hydride ions). This surface is preferably resistant to the detrimental chemical effects of other gases present in the source gas mixture containing hydrogen. In particular, this surface is preferably resistant to poisoning by sulfur and its compounds, CO, $CO_2$, ammonia, and carbon. The second membrane surface facing the hydrogen sink preferably comprises one or more metals or metal alloys having a low desorption energy for hydrogen, about 270 kJ/mol or less.

The substantially metallic layer blocking the pores of the porous support (e.g., the porous ceramic) preferentially has a low activation energy for bulk diffusion of hydrogen or should be sufficiently thin, preferably less than one micron thick for palladium and its alloys and less than 150 microns thick for V, Ta, Nb, Zr and their alloys, so that bulk diffusion is not rate limiting. A substantially metallic layer of appropriate thickness can, for example, be made by depositing one or more metals or alloys within the pores of a porous ceramic, by attaching a thin foil of the metal or alloy onto a porous support or by positioning a thin foil of the metal or alloy between two porous support layers.

The porous carrier can be any porous refractory material, including refractory ceramics, metal nitrides, metal borides and metal carbides, various metal oxides or mixed metal oxides, any porous metals or metal alloys including, for example, ferrous metals or metal alloys, molybdenum, tungsten, cobalt, chromium, and alloys thereof. The porous ceramic can be any ceramic material (in various forms), including alumina, magnetite, cordite, spinel, magnesia, MgAl$_2$O$_4$, magnesium oxide, mullite, various alumino-silicates, various perovskites, clays, porcelains and preferably comprises Co, Mo, or Fe ions or mixtures thereof. The porous carrier may also be a water-gas shift catalyst such as 90 wt % magnetite stabilized by 10 wt % chromium oxide or a cobalt analog of this water-gas shift catalyst. In a specific embodiment, the porous ceramic is a mixed metal oxide containing cobalt, particularly a perovskite mixed metal oxide containing cobalt.

The porous ceramic can, for example, have the general stoichiometric formula:

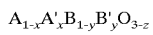
$$A_{1-x}A'_xB_{1-y}B'_yO_{3-z}$$

where A is La or a Lanthanide metal or combination thereof; A' is Na, K, Rb, Sr, Ca, Ba; or a combination thereof; B is a +3 or +4 metal cation of a heavy metal (e.g., Pb, Bi, Ce, Zr, Hf, Tl, or Th), a third row transition metal: a Group IIIb metal (i.e., Al, Ga, or In) or a combination thereof; B' is a metal that induces electronic conductivity, e.g., a first or second row transition metal ion; $0 \leq x \leq 1$; $0 \leq y \leq 1$; and z is a number that renders the composition charge neutral. Ceramic carriers of the above formula may contain 2, 3 or 4 A, A', B, and/or B' metals.

Ceramic carriers of this invention can also have the formula:

$$A_{1-x}A'_xB_yO_{3-\delta}$$

where x, $0<y \leq 1$, $\delta$, A, A' and B have the definitions above and particularly where B is a combination of two first or second row metals and y is not 0. Of particular interest are ceramic carriers having B which is a combination of Co and another first or second row transition metal, e.g., Fe.

Ceramic carriers of the above formulas include those in which:

A is La;
A' is Sr, Ca, Ba or combinations thereof;
A' is Na, K, Rb or combinations thereof;
B is Pb, Bi, Ce, Zr, Hf, Tl, Th or combinations thereof;
B is Al, Ga, In or combinations thereof;
B is a third row transition metal ion or combination thereof;
B' is a first row transition metal ion or combinations thereof;
B' is a second row transition metal ion or combinations thereof
$0<x \leq 1$;
$0<x<1$;
$0<y \leq 1$;
x is 1;
y is 1; or
$0<y<1$.

Ceramic carriers include those having the above formula and any combination of variable definitions listed above.

In specific embodiments, the porous ceramic is a lanthanum strontium cobalt oxide.

In a specific embodiment the carrier ceramic can have the formula:

$$A_{1-x}A'_xCo_{1-y}B_yO_{3-z}$$

where A is La or a lanthanide metal; A' is Sr, Ca, Ba; or combinations thereof and B is another transition metal ion (e.g. Fe); $0<x<1$; $0 \leq y<1$; and $\delta$ is a number that renders the composition charge neutral. In specific embodiments, the porous ceramic is a lanthanum strontium cobalt oxide, and particularly those having the formula: La$_{0.4-0.8}$Sr$_{0.6-0.2}$CoO$_{3-z}$, and more preferably La$_{0.5}$Sr$_{0.5}$CoO$_{3-\delta}$ where z is a number that renders the composition charge neutral.

In specific embodiments the carrier materials can be a mixed metal oxide as described in any of U.S. Pat. Nos. 5,821,185; 6,037,514; or 6,281,403 each of which is incorporated by reference herein in its entirety for the description of these materials. Materials described in these patents can be used to make proton and electron conducting membranes.

The metal or metal alloy that is introduced into the pores of the porous support or carrier is preferably selected from Pd, Ni, Cu, Co, Fe, Mo, Ta, Nb, V, Zr, Ag, Pt and alloys thereof. Specific metals useful in this invention include Pd, Ta, Nb, V, Zr, Ni, Co, or Fe. One or more of V, Nb, Ta, Zr can in specific examples be alloyed with one or more of Co, Fe, Rh, Ru, Pt, Mo, W, Ni, Al, or Mg. Alloys useful in this invention include those of V, those of Nb, those of Ta and those of Zr and particularly alloys of these metals with Co, Ni or Al. Specific alloys useful in this invention include alloys of Pd and Ag with a Pd to Ag ratio of 77 to 23.

The support ceramics can include alumina, zirconia, magnesia, MgAl$_2$O$_4$, various alumino-silicates, clays, porcelains and other ceramic materials. A porous ceramic can also be supported in porous metal and metal alloys.

In a specific embodiment, the hydrogen transport membrane of this invention comprise a porous ceramic into the pores of which is deposited a substantially metallic layer which renders the porous ceramic impermeable to gases other than hydrogen. The substantially metallic layer comprises a metal or metal alloy. Preferred metals are Pd, Ta, Nb, V, Zr, Ni, Co and Fe. The substantially metallic layer is sufficiently thin to enhance the rate of hydrogen transport without substantial transport of other gases.

A composite membrane of this invention comprises two or more materials. For example, a porous ceramic with a metallic layer or film in its pores or a porous ceramic in the pores of a metal, metal alloy or other ceramic substrate and wherein there is metallic layer in the porous ceramic. A composite ceramic comprises two or more different ceramic materials or a ceramic and a metal or metal alloy. The term as used herein includes materials (e.g. ceramics or metals) having pores which are at least partially filled with another type of material (e.g., ceramics or metals or metal alloys).

Membranes of this invention are substantially impermeable to gases other than hydrogen. A membrane is an element having two sides or surfaces, which is used to separate two reactor chambers and mediate transport or diffusion of selected chemical species between the two chambers. Membranes can be of any convenient shape including disks, tubes, and plates. The membranes of this invention mediate transport or diffusion of hydrogen from a hydrogen source to a hydrogen sink.

The invention also relates to a membrane reactor and a method for separating hydrogen gas from a gas mixture, more particularly for separating hydrogen from gas mixtures containing H$_2$S or CO and more specifically for separating hydrogen from water-gas-shift mixtures. The membrane reactor of this invention comprises a hydrogen source (a chamber in fluid communication with a gaseous source containing hydrogen) and a hydrogen sink. The hydrogen sink provides for a low concentration of hydrogen by physically removing hydrogen, e.g., by application of a vacuum by using a sweep gas or by consuming hydrogen, e.g., by chemical reaction. The membrane reactor of this invention can provide purified hydrogen (e.g., separated from other gases in the hydrogen source), gas mixtures enriched in hydrogen (e.g., hydrogen in an inert gas), removal of hydrogen from a gas mixture, and provide hydrogen for further reaction. Hydrogen from the reactor can be transported to another reactor for reaction to make desired products including methanol and hydrocarbon fuels. Alternatively, hydrogen can be reacted with a hydrogen-reactive gas within the reactor directly after transport. The reactive gas can be oxygen, and the products water and energy. The energy released can be used to power various devices.

BRIEF DESCRIPTION OF THE DRAWINGS.

FIGS. 3A–D illustrate another exemplary membrane (30) of this invention and illustrate a method for making the membrane. The pores of a sintered porous layer of hydrogen-permeable material (FIG. 3A) (32) are impregnated (filled) and sealed (FIG. 3B) with an organic, inorganic, metal or metal alloy (pore blocking material, 35) to form a hydrogen-permeable membrane. Surface layers of the membrane can be removed (FIG. 3C) and catalyst layers (17A and 17B) can be applied to the membrane surfaces (FIG. 3D).

DETAILED DESCRIPTION OF THE INVENTION

Figure 1:
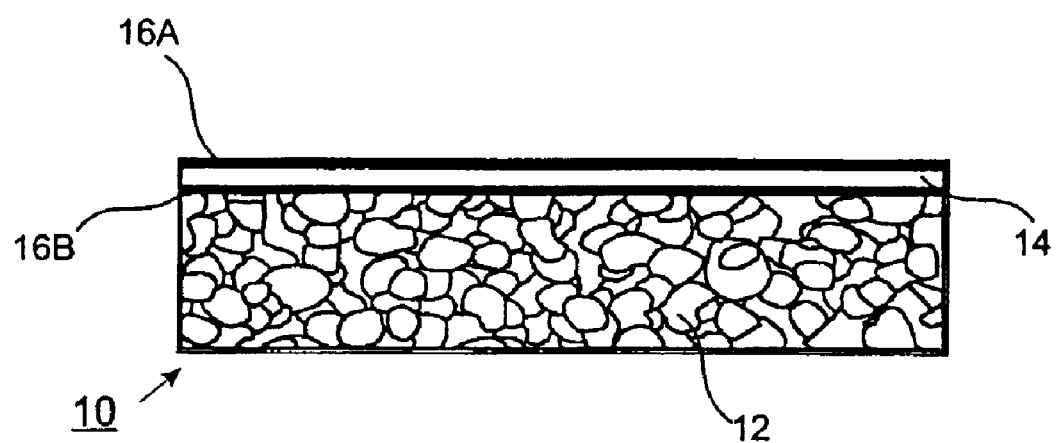
FIG. 1 illustrates an exemplary membrane (10) of this invention with a porous support layer (12) (e.g., a sintered ceramic, glass or metal powder) a dense hydrogen-permeable metal or alloy layer (14) and two catalyst layers on a membrane surface (16A) and between the metal/alloy layer and the porous support layer (16B). The catalyst may be a hydrogen dissociation catalyst (e.g., Pt, Ir, Rh or alloys thereof, preferred).

Hydrogen transport membranes function for transport of hydrogen from a hydrogen source to a hydrogen sink and allow hydrogen to be separated from other gases. A membrane has a side facing the hydrogen source unto which hydrogen molecules adsorb and are dissociated, and a side facing the hydrogen sink from which hydrogen molecules are desorbed. A hydrogen-permeable metallic layer(s) formed between the surfaces function for hydrogen transport. The membranes of this invention are designed to maximize the flux of hydrogen, while resisting poisoning and degradation by the components of the hydrogen source gas and preferably to minimize mechanical stress which will result in longer useful life.

Membranes of this invention comprise some material that functions for the dissociation of molecular hydrogen. This function may be provided by certain metals employed in the membrane which exhibit catalytic properties for the dissociation of hydrogen, such as palladium and its alloys. Metal alloys which contain Co, Fe, Rh, Ru, Pt, Mo, W or Ni can also function as catalysts for the dissociation of hydrogen. Additionally, certain ceramic materials can function as catalysts for the dissociation of hydrogen. Alternatively or in combination, one or more catalyst may be provided in the or on the membrane, e.g., at the hydrogen source surface, which dissociate molecular hydrogen and resist poisoning. The membranes herein also optionally provide materials at the hydrogen sink surface which minimize hydrogen desorption energy.

Thin metallic layers are formed, for example, in the membranes by deposition of metals or mixtures of metals in the pores of a ceramic. Alternatively, thin foils of metals are used, a ceramic adhesive or paste is applied to a foil to form a porous ceramic, or cermets are fabricated by sintering together powders of metal and ceramic. The metallic layers formed are preferably sufficiently thin so that bulk diffusion of hydrogen is not rate limiting.

In some of the specific embodiments, the hydrogen transport membranes of this invention are cermet composite membranes in which a mixture of metal or metal alloy particles and ceramic particles are sintered together to form layers including layers that are hydrogen-permeable preferably 50 microns or thinner. In preferred embodiments the porous ceramic and the metal or mixture of metals are selected to maximize matching of the crystal lattice constants of the ceramic and metal materials. Matching of the crystal lattice constants of the ceramic with the deposited metal or metals or with the metal or metals mixed into the cermet provides for a good epitaxial/endotaxial fit between the two materials to minimize mechanical strains and to improved mechanical strength of the composite membrane.

A concentration gradient of hydrogen provides the ultimate thermodynamic driving force for the transport of hydrogen across membranes. A concentration gradient must be maintained across the membrane at all times during operation. The membrane transports hydrogen from the hydrogen source to a hydrogen sink where a low concentration of hydrogen is maintained. Hydrogen concentration is kept low by physical removal of hydrogen, for example, by application of a vacuum, by use of a sweep gas, or by chemical reaction of the hydrogen after it is transported. To maximize the driving force, the concentration difference between the source and the sink should be made as large as possible.

Hydrogen transport mediated through the membrane is believed to function by the following steps:
1. Diffusion of hydrogen molecules from the hydrogen source to the membrane surface;
2. Adsorption of hydrogen molecules on the membrane surface facing the source;
3. Dissociation of hydrogen molecules to hydrogen atoms on the membrane surface to form hydrogen atoms, followed by loss of electrons and formation of H+ ions;
4. Transport of H+ ions and electrons through the membrane;
5. Recombination of H+ and electrons and formation of hydrogen molecules at the surface facing the hydrogen sink;
6. Desorption of hydrogen molecules from the surface facing the sink; and
7. Diffusion of hydrogen molecules away from the surface.

The rate of hydrogen transport can be limited by any one of the listed steps or by a combination of steps. The rate limiting step may vary depending upon the exact membrane design. Diffusion of hydrogen molecules in the gas phase to and from the membrane surface (Steps 1 and 7) is normally very rapid compared to the other steps. However, if differential pressure across the membrane is extreme, and it becomes necessary to make the porous layers very thick, the diffusion of molecular hydrogen through the tortuous pores can become rate limiting. Step 2 may become rate limiting if the surface area of the hydrogen dissociation catalyst is limited or if adsorption sites are occupied by other components of the gas mixture, such as CO. Desorption of the other components from the surface of the catalyst may be rate limiting and may be necessary before hydrogen adsorbs and dissociates. Electron transfer reactions: $H \rightleftharpoons H++e-$ are usually extremely rapid, however, ionization of hydrogen atoms to protons is highly endothermic and requires considerable energy, and Step 3 could be rate limiting if all other steps are rapid. Recombination of protons with electrons (the reverse reaction of Step 5) on the hydrogen sink side of the membrane should be very rapid and not be rate limiting. Step 4, diffusion of protons through the metal, will be rate limiting if the metal is thick, and all other steps are rapid. Although much of the literature describes hydrogen transport in the form of protons, transport as hydrogen atoms, transport as proton-electron pairs, or transport as hydride ions cannot be ruled out in all cases. Step 6, desorption of hydrogen molecules from the surface facing the sink, will be endothermic in all cases and will require energy. Step 6 can become rate limiting if all other steps are rapid.

For hydrogen to adsorb on a metal surface held above cryogenic temperatures, hydrogen molecules must dissociate into hydrogen atoms and chemisorb. Thus, Steps 2 and 3 can be combined into one dissociative chemisorption step:

$$H_2(gas) + 2* \rightarrow 2H\ (ad);\ \Delta H_{adsorption}\ \text{negative}.$$

Similarly, desorption Steps 5 and 6 are combined as follows:

$$2H\ (ad) \rightarrow H_2(gas) + 2*;\ \Delta H_{desorption}\ \text{positive}.$$

The "*" indicates an unoccupied surface site and H(ad) represents adsorbed hydrogen atoms on the metal surface.

Diffusion of hydrogen across dense metal membranes occurs by diffusion of hydrogen in a dissociated form and not by diffusion of hydrogen molecules. It is thus essential that hydrogen molecules be dissociated first into atoms on the surface of the membrane facing the hydrogen source. The surface of the membrane facing the hydrogen source should be capable of catalytically dissociating hydrogen into adsorbed atoms. This implies that pairs of adjacent surface sites should be maintained in reasonable concentrations to facilitate dissociative adsorption of hydrogen. It is desirable that occupation of surface sites by sulfur, CO, carbon, or other adsorbates, which block adsorption and dissociation of hydrogen, should be minimized. In this invention, membranes are preferably provided with catalysts, particularly those containing cobalt, cobalt-molybdenum, iron, magnetite, lanthanum strontium cobalt oxide, Pt, Ir, $WS_2$ or $MoS_2$ which are resistant to poisoning and particularly resistant to poisoning by sulfur.

We have found that hydrogen flux in the membranes of this invention is proportional to the square root of hydrogen partial pressure. This implies that hydrogen is transported in a dissociated form as noted above. Dissociated forms of hydrogen include protons ($H^+$), hydride ions ($H^-$), neutral atoms, or as proton-electron pairs with proton/electron separation sufficiently great that the proton and electron are considered a pair rather than a neutral ion.

Although, we currently consider proton transfer to be the most likely mechanism for hydrogen transport, we do not wish in any way to be limited by this proposed mechanism. Further, hydrogen transfer may occur by different mechanisms in different materials employed in the membranes of this invention or hydrogen transfer may occur by several mechanisms in a given material.

After transport through the membrane and electron transfer, the dissociated hydrogen must recombine into hydrogen molecules and desorb from the membrane surface facing the hydrogen sink. Desorption requires input of energy. To facilitate desorption, the surface of the membrane facing the hydrogen sink should have surface sites having the lowest possible desorption energy for hydrogen. If metal hydrogen transport layers in the membrane are sufficiently thin, and bulk diffusion and other steps are no longer rate limiting, then desorption from the membrane can become rate limiting.

Table 1 lists chemisorption energies of common metals which are useful for hydrogen desorption (See Benzinger 1991).

TABLE 1

Hydrogen Desorption Energies (kJ/mol)

| Metal | Crystal Face | D(M-H) |
|---|---|---|
| Ag | (111) | 218 |
| Pt | (100) | 247 |
| Pt | (111) | 247 |
| Co | (0001) | 251 |
| Co | (1010) | 251 |
| Cu | (111) | 251 |
| Ni | (110) | 259 |
| Ni | (100) | 263 |
| Ni | (111) | 264 |
| Pd | (111) | 259 |
| Pd | (100) | 268 |
| Pd | (110) | 268 |

All of the listed metals have desorption energies of less than about 270 kJ/mol. Note that desorption energy varies with crystal face. While all of the listed metals in Table 1 will function for hydrogen desorption. Silver has by far the lowest desorption energy for hydrogen of the listed metals. Silver sites at the surface of the membrane facing the hydrogen sink will enhance hydrogen desorption rate and enhance the overall rate of hydrogen transport through a membrane. Surface chemistry of other metals that function for hydrogen transport can be improved by alloying with silver. In such mixtures, silver at least in part segregates to the surface of the metal layer and thus can facilitate desorption of hydrogen from the membrane surface facing the hydrogen sink. Other common metals such as Fe, W, Mo, Nb, and Ru have energies for hydrogen desorption ranging from 276–293 kJ/mol and are less well suited for desorption of hydrogen compared to the metals (and alloys thereof) listed in Table 1. However, alloying Fe, W, Mo, Nb, or Ru with any of Ag, Co, Cu or Pt would improve their ability to desorb hydrogen.

Palladium is recognized as the most commercially successful hydrogen transport membrane material. However, it is rapidly poisoned by sulfur and it does not function as a hydrogen dissociation catalyst or for hydrogen transport if sulfur adsorbs at its surface. According to Amandusson (2000), only one third of a monolayer of sulfur is sufficient to completely poison hydrogen adsorption on Pd (111). Assuming sulfur contamination of 500 ppb, equivalent to a partial pressure of $3.8 \times 10^{-4}$ torr, a palladium surface will be poisoned in less than one second, assuming that a surface is completely saturated with a gas in one second if the partial pressure is $1 \times 10^{-6}$ torr and the sticking coefficient is one (i.e. every molecule which strikes the surface adsorbs).

Table 2 lists exemplary activation energies for bulk diffusion of hydrogen through metals based upon data of D. N. Beshers, (1973). Vanadium, niobium and tantalum all have superior bulk diffusion properties for hydrogen compared to palladium. However, the catalytic properties of these metals for hydrogen dissociation are inferior to those of palladium. In addition, these metals are susceptible to oxidation and to carbide and nitride formation by reaction with carbon and ammonia which may be present in hydrogen source gas.

TABLE 2

Activation Energies for Bulk Diffusion of Hydrogen

| Metal | Q(kJ/mol) |
|---|---|
| V | 5.6 |
| Nb | 10.2 |
| Ta | 14.5 |
| Pd | 24.0 |
| Pt | 24.7 |
| Cu | 38.9 |
| Ni | 40.0 |
| γ-Fe | 44.8 |

In general, the energies for bulk diffusion of hydrogen ions through the exemplified metals as seen in Table 2, are quite low (5.6–45 kJ/mol) compared to the desorption energies of hydrogen molecules from metals (218–293 kJ/mol). As the metallic layers in membranes are reduced in thickness, desorption of hydrogen molecules from the side of the membrane facing the hydrogen sink will be come rate limiting and the rate of diffusion of hydrogen through the bulk material will be become less important compared to surface desorption. When thin metallic layers are used to transport hydrogen, it is possible to replace palladium with less expensive metals, such as nickel, cobalt and iron and alloys thereof, having superior surface properties or with vanadium, niobium or tantalum coated with catalysts.

For clean surfaces, desorption of hydrogen may become rate limiting as the thickness of the metallic layer is decreased below one micron in the case of palladium. In contrast, when gases are present in the hydrogen source that poison the catalysts that facilitate dissociation of molecular hydrogen, dissociation of molecular hydrogen will become rate limiting. This invention employs catalysts containing cobalt, molybdenum or iron which are resistant to poisoning by sulfur. Although sulfur adsorbs on cobalt and transforms the surface into a sulfide of cobalt, the sulfided surfaces retain catalytic activity for breaking hydrogen-hydrogen bonds. Iron based water-gas-shift catalysts such as 90 to 95 weight % $Fe_2O_3$ with 5 to 10 weight % $Cr_2O_3$ with sulfur tolerance can also be used to dissociate hydrogen in the membranes of this invention, as can cobalt analogs of the water-gas shift catalyst.

Carbon monoxide can be a component of the hydrogen source gas. For example, carbon monoxide is generated along with hydrogen and carbon dioxide during reforming of natural gas, coal, and petroleum. Carbon monoxide poisons catalysts including Pd by occupying surface sites needed for dissociation of hydrogen. The more strongly CO adsorbs to a metallic surface, the more significant detrimental effect it will have on catalysis. Table 3 (from data of D. N. Beshers, 1973) lists the desorption energies of CO from exemplary metals. Palladium has the highest heat of desorption for CO of the metals listed and therefore will be most susceptible to poisoning by CO. Improvements can be achieved in resistance to poisoning by CO by replacing palladium (in whole or in part) by metals with lower heats of desorption for CO, for example, Ag, Cu, Co or Ni. Addition of Ag to Pd should result in improved resistance to CO poisoning of the catalyst. However, if sulfur is also present, Ag at the metal layer surface will be rapidly transformed into silver sulfide. Copper with a relatively low CO desorption energy should also exhibit resistance to CO poisoning. Cobalt should be a good balance given improved resistance to CO poisoning compared to palladium and also providing for sulfur resistance as discussed above.

TABLE 3

Desorption Energies of Carbon Monoxide (kJ/mol)

| Metal | Crystal Face | $\Delta H_{2d}$ |
|---|---|---|
| Ag | (111) | 25 |
| Cu | (100) | 70 |
| Co | (0001) | 105 |
| Ni | (100) | 109 |
| Ni | (111) | 109 |
| Pt | (111) | 126 |
| Pt | (100) | 134 |
| Pd | (111) | 142 |
| Pd | (100) | 151 |

Adsorption of CO can also poison a catalyst surface by depositing carbonaceous residues by the reaction: $2CO \rightarrow C + CO_2$. This detrimental reaction can be countered by adding a large excess of steam, carbon dioxide or hydrogen to the system to remove surface carbon.

Carbon dioxide can also poison the catalyst surface by the formation of stable carbonates. To avoid or minimize such poisoning, metals which form stable carbonates should be avoided. Cobalt carbonate decomposes at 52° C. and will not be stable under water-gas-shift temperatures of 350–450° C.

In summary, hydrogen transport membranes and particularly those that are compatible for integration with sulfur tolerant water-gas-shift catalysis should have the following properties:

1. The membrane surface facing the hydrogen source should be capable of adsorbing and dissociating hydrogen and should be resistant to sulfur, CO, $CO_2$, ammonia, steam, and carbon;

2. The membrane surface facing the hydrogen sink should comprise a metal or metal alloy having a low desorption energy for hydrogen; and 3. The membrane material should have a low activation energy for bulk diffusion of hydrogen or should be made sufficiently thin (preferably less than one micron) that bulk diffusion is not rate limiting.

The first two properties are obtained by selection of materials, particularly metals or metal alloys, for use in the membranes herein. In order to make metal membranes sufficiently thin so that bulk diffusion is not rate limiting, this invention employs thin deposits of metals or metal alloys formed and supported in the pores of porous ceramic membranes. The metals or metal alloys that facilitate hydrogen transport and desorption are chemically deposited into the ceramic pores to plug them. In specific embodiments, metals are deposited into the pores of ceramic by infusing aqueous solutions of corresponding metal salts into the pores and reducing the metal ions of the infused salt with heating to deposit metallic layers in the pores. In a preferred embodiment, metals are deposited into the pores by chemical vapor deposition, in which volatile compounds of the metals are decomposed to deposit the metal. In other preferred embodiments, metal foils or cermets are used.

Thin foils of hydrogen-permeable metals or cermets containing hydrogen-permeable metals may be employed to obtain hydrogen-permeable membranes. Various composite membrane structures can be prepared.

Thin foils of hydrogen-permeable metal can be employed in combination with porous supports. The foils can be applied or attached to a porous metal (or alloy) or ceramic support, or can be positioned or held (e.g., by clamps or other holders) in contact with a porous support or held between two porous supports. The supports can be made of metal (or alloy), ceramic or other inorganic material or an organic polymer or resin. In another alternative method, the thin foil may be coated on one or both sides with a material which forms a porous support. For example, the foil may be coated with a ceramic adhesive or ceramic paste which forms a porous ceramic. In another example, the foil may be coated with an organic polymer or polymer precursor which forms a porous polymer or resin support.

A cermet is a composite material that has a metal component (containing one or more metals or an alloy) and a ceramic component. Cermet membranes of this invention can be formed in several ways. For example, powders of metal (or alloy) and ceramic are combined in a desired ratio (preferably the range of metal or alloy employed ranges from about 40–60 volume %), optionally with one or more binders and sintered. The sintered cermet may be made sufficiently thick to be self-supporting (e.g., preferably 100–500 microns thick). Alternatively, the mixed metal (or alloy), ceramic and binder(s) can be formed into an applique, preferably ranging from 10–50 microns thick, which is applied to a porous ceramic support in the green state. The green support with cermet applique is then sintered together to form a cermet containing composite membrane. In another alternative method, slurries of cermet powders can be coated onto porous supports by dip-coating followed by sintering to form hydrogen-permeable membranes.

Hydrogen transport membranes of this invention preferably exhibit mechanical strength such that they have an extended useful lifetime and are resistant to mechanical stress which results in cracking and leakage.

It has been found that the porous ceramic and the metal or metal alloy to be deposited in the pores of the ceramic or coated on the porous ceramic, or the materials used to fabricate a cermet, can be selected to minimize mechanical stress in the composite membrane by matching the crystal lattice constants of the ceramic to the metal. This can be done, for example, by selecting an appropriate ceramic with lattice constants to substantially match those of a metal or metal alloy that provides desired high permeability for hydrogen. In a specific embodiment, the stoichiometry of a mixed metal oxide is adjusted so that the crystal lattice constants of the ceramic formed from it will substantially match the lattice constants of the selected metal or metal alloy.

Lattice constants in crystalline materials are routinely measured using x-ray diffraction, although electron diffraction is also used. Commercially available, x-ray powder diffractometers are convenient for the measurements. In these instruments, polycrystalline samples are exposed to an approximately monochromatic x-ray beam. Angles of x-ray diffraction maxima are measured. If two materials have diffraction maxima at the same measured angle, then this implies that they both have an identical lattice spacing corresponding to this diffraction maximum. From the known wavelength of the incident x-rays, and the measured angle of diffraction maximum, the atomic distances between crystal lattice planes can be calculated.

Composite materials used as membranes for gas separation are greatly improved by controlling the number of dislocations at internal interfaces. Interfacial dislocations enhance diffusion of many substances through dense membranes. However, in the case of composite membranes in which it is necessary to separate and purify hydrogen from gas mixtures contaminated with oxygen, nitrogen, carbon and sulfur, it is desired to minimize the number of dislocations at the interfaces of the composite so as to minimize diffusion of the contaminants through the membrane. Interfacial dislocations are minimized by matching the crystallographic lattices of the composite materials. In lattice matching, the pair of materials in the composite is chosen to have crystallographic planes of similar symmetry as well as closely matched interatomic lattice spacings. Lattice symmetry and lattice spacings are determined by x-ray or electron diffraction. To minimize dislocations at interfaces, the lattice mismatch is ideally kept below 1–2%, although mismatches up to 15% may be tolerated, depending upon interatomic forces and film thickness, which determine the stress at the interface. In composite membranes used to separate oxygen from air, diffusion of oxygen is enhanced by intentionally increasing the number of interfacial dislocations in a composite by increasing the misfit above 15%. Control of interfacial dislocations between thin films and their substrates through control of lattice match has long been used in the semiconductor industry.

In defining misfit and mismatch of lattices, the convention of van der Merwe (1984) is adopted. Misfit specifically refers to quantification of dimensional differences, including differences introduced by thermal expansion. Mismatch includes also misorientation and differences in symmetry between substrate and overlayer. One-dimensional misfit, f, can be mathematically defined as $f=(o-s)/s$ where o is the distance between lattice atoms in a particular crystallographic direction in the overlayer, o, and s is the distance between lattice atoms in a parallel crystallographic direction in the substrate, s.

For example, for palladium deposited into the pores of a ceramic, the ceramic substrate is chosen to match both the crystallographic symmetry and the lattice constants of palladium. Elemental palladium has the face centered cubic crystal structure with a cube edge of 3.89 Å at room temperature. Because of the symmetry in the cubic system, if the cube edges match, the major other lattice spacings will also match. In the preferred embodiment, a ceramic substrate is chosen with cubic crystal symmetry and with a lattice spacing in a cube face close to 3.89 Å and preferably within the range 3.80 Å<x<3.96 Å to yield a misfit of less than 2%. A specific example is palladium deposited in the pores of the cubic perovskite material $La_{0.5}Sr_{0.5}CoO_{3-z}$.

In the more preferred embodiment, the ceramic substrate is chosen to have lattice constants of palladium at the operating temperature of the membrane. In the specific case of using membranes to extract hydrogen from a water-gas shift reaction mixture, the preferred temperatures are between 200 and 500° C. In a specific example, the composition of $La_xSr_{1-x}CoO_{3-z}$ is varied between x=0.8 and x=0.4 to vary the lattice spacing of the perovskite to match that of palladium at the operating temperature. In a further preferred embodiment, the composition of the perovskite substrate is varied between x=0.8 and x=0.4 to match that of palladium which has changed its lattice constants due to absorption of hydrogen, in addition to changes due to temperature.

Although misfits of less than 2% are most desired, it is possible for misfits up to 15% to be tolerated without the formation of dislocations. For the case where membranes are used for separation of hydrogen from a contaminated gas mixture containing oxygen, carbon, sulfur and nitrogen, and where very pure hydrogen is desired, it is desired to eliminate dislocations at the metal-ceramic interface by minimizing lattice misfit. However, if it is desired to separate larger atoms, specifically oxygen, from a gas mixture, specifically air, then it is desired to maximize the number of dislocations at the metal-ceramic interface to allow enhanced diffusion of oxygen. In the case in which dislocations are desired, lattice misfit is intentionally increased to values where dislocations spontaneously form.

Theoretically, there are an infinite number of lattice constants in any crystalline material, and it would not be practical to match all lattice constants between two materials unless both have the identical crystal structure. In the example of lattice matching between palladium and other materials with cubic crystal symmetry, if one cube edge matches, then by symmetry, all cube edges automatically match as well as all cube face diagonals and cube diagonals and many other lattice constants. For good lattice matching in the case of two cubic materials sharing the same symmetry there should be good lattice matching (less than about 15% mismatch and preferably less than 10% mismatch and more preferably less than about 2% mismatch) in all of the most important crystallographic planes of low Miller index.

In the more complicated case of lattice matching body centered cubic metals such as Nb, V and Ta to an alumina substrate, mismatch is small only on a few select planes such as the (011) plane of niobium deposited atop the (1120) planes of alumina. Never-the-less, interfaces with a minimum of dislocations can be produced. Lattice matching in these complicated cases is approximated by calculating a one-dimensional lattice matching in a particular crystallographic plane and calculating a second one-dimensional lattice matching in a crystallographic direction perpendicular to the first, but in the same plane. This type of approximation is consistent with methods commonly used in the literature of epitaxial growth and allows the selection of compatible materials.

Lattice matching can be performed between carrier materials that are refractory materials, ceramics, metals or metal alloys and the metal or metal alloys that are to be introduced into the pores of the carrier or coated on the porous carrier or support. Lattice matching does not depend upon the size of the pores in the carrier material and so can be employed with any porous materials.

Lattice matching does not apply to composite membranes of this invention that employ non-crystalline organic polymers or resins as components.

A specific example of a lattice matched composite system for minimizing interfacial dislocations and thus minimizing diffusion of oxygen, nitrogen, carbon and sulfur in a hydrogen transport membrane is palladium metal supported in a porous perovskite ceramic of $La_{0.5}Sr_{0.5}CoO_{3-z}$. Both materials have cubic crystal symmetry. The lattice constants of this perovskite material have been adjusted to match those of palladium, within 1–2% by varying the relative amounts of La and Sr. Other materials with the perovskite crystal structure can also be synthesized to match the lattice constants of palladium. Alternatively, the lattice constants of the Pd can be varied to match ceramic substrates by alloying the Pd with other metals. Because of the similarity of platinum to palladium, a second example of a hydrogen transport composite membrane is platinum supported by $La_{1-x}Sr_xCoO_{3-z}$. The ceramic need not be limited to perovskites. Further examples of lattice matched cermets for hydrogen transport membranes include niobium on porous alumina, tantalum on porous alumina, and molybdenum on porous alumina and vanadium on porous aluminum. In all of these cases the (011) crystallographic planes of the body centered cubic metals are very well lattice matched to the (1120) planes of the $Al_2O_3$. Thermal expansion between these metals and alumina is also well matched.

Table 4 provides a short list of perovskite ceramics which are well lattice matched to palladium at 298 K. This list is by no means exhaustive, and many other perovskites (of general formula, $A_{1-x}A'_xB_{1-y}B'_yO_{3-z}$, where z is a number that rendered the compound neutral) with various metal elements substituted into the "A" and "B" lattice sites can be synthesized to give similar lattice matching. Table 4 lists values only for Pd(100)//perovskite (100) and Pd[100]//perovskite[100], using standard crystallographic notation for crystallographic planes and crystallographic directions. Note that some of the perovskites such as $LaFeO_{3-x}$ and $SrTiO_{3-x}$ in Table 4 have basically zero mismatch with palladium and have perfect lattice matching at 298 K. Both the palladium and perovskite have cubic symmetry, and therefore there exist many crystal planes which have good lattice matching.

Palladium supported on α-alumina has been used for hydrogen-permeable membranes. Even though palladium which is face centered cubic and alumina which is hexagonal do not share the same crystallographic symmetry, it is possible to find some planes of reasonable lattice match between cubic palladium and hexagonal alumina. For example, lattice matches can be found for the crystallographic planes of $Pd(111)//Al_2O_3(1120)$ and the crystallographic directions of $Pd[110]//Al_2O_3[0001]$. Using lattice constants for hexagonal alumina of a=4.76 Å and c=13.01 Å (using standard crystallographic values at 298 K and standard notation for the a and c axes of a hexagonal crystal) and that a=3.8902 Å for the cube edge of face centered cubic palladium, the cube diagonal of palladium has a distance of 5.50 Å. Two such cube diagonals would span a distance of 11.0 Å, which would match the c distance of α-alumina of 13.01 Å with a misfit of (11.0−13.01)/13.01×100%=−15.4%. In the perpendicular Pd[112] direction Pd palladium has a lattice constant of 4.76 Å in the Pd(111) plane, which matches exactly with the a spacing of alumina of 4.76 Å. However, this perfect lattice match in one direction would be combined with the relatively poor match of −15.5%, in the perpendicular direction, which is near the limits of acceptable lattice match.

TABLE 4

Perovskites Lattice Matched to Pd (a = 3.8902 ± 3 Å)

| Perovskite Formula | Lattice Constant Å | % Mismatch |
|---|---|---|
| $CaTiO_{3-z}$ | 3.803 | 2.3 |
| $GdMnO_{3-z}$ | 3.82 | 1.8 |
| $LaCoO_{3-z}$ | 3.82 | 1.8 |
| $PrMnO_{3-z}$ | 3.82 | 1.8 |
| $La_{0.6}Ca_{0.4}MnO_{3-z}$ | 3.83 | 1.6 |
| $CaTiO_{3-z}$ | 3.853 | 0.97 |
| $SrFeO_{3-z}$ | 3.869 | 0.55 |
| $La_{0.6}Sr_{0.4}MnO_{3-z}$ | 3.87 | 0.52 |
| $LaCrO_{3-z}$ | 3.88 | 0.26 |
| $LaMnO_{3-z}$ | 3.88 | 0.26 |
| $LaFeO_{3-z}$ | 3.89 | 0 |
| $SrTiO_{3-z}$ | 3.893 | 0 |
| $La_{0.6}Ba_{0.4}MnO_{3-z}$ | 3.90 | −0.25 |
| $BaTiO_{3-z}$ | 3.98 | −2.3 |

Of the materials in Table 4, $LaFeO_{3-z}$, $LaCrO_{3-z}$ and mixtures of $LaFe_{1-y}Cr_yO_{3-z}$ (which form solid solutions from 0 to 100% Fe, balance Cr, and which all have lattice constants expected at 3.88 to 3.89 Å), $BaTiO_{3-z}$ provide hydrogen-permeable membranes in combination with Pd and its alloys (or other hydrogen-permeable metals and alloys to which they are lattice matched) that exhibit improved mechanical stability and operating lifetime. The titanates $CaTiO_{3-z}$, $SrTiO_{3-z}$ will also provide improved hydrogen-permeable membranes in combination with Pd metal.

Some porous ceramic, metal or metal alloy carriers are available commercially or can be prepared using known methods or by routine adaptation of known methods. Methods for coating or deposition of metals or metal alloys onto porous ceramics are known in the art. For example, deposition of palladium and palladium alloys onto commercially available porous alumina and porous stainless steel is well known in the art. Specific examples herein employ V, Ta, or Nb, on alumina, and Pd on various perovskites. Metal and metal alloy foils of thickness appropriate for use in this invention are commercially available or can be made by art-known methods. Cermet materials useful in the present invention may be commercially available or can be prepared by art-known techniques in view of the teachings herein. Ceramic pastes and/or adhesives may be commercially available or may be prepared by methods known in the art. For example, commercially available high temperature alumina paste or cement, such as Cotronics 903HP ceramic adhesive, can be used to form porous ceramic supports.

Organic polymers, including organic resins, can be employed in the membranes of this invention as porous supports for hydrogen-permeable metal layers or to block pores of porous hydrogen-permeable materials. The polymers or resins employed must maintain mechanical integrity at the selected operation temperature contemplated for the membrane. Judicious selection of the polymer resin material for use at elevated temperatures is required. Suitable polymers or resins exhibit stability and retain mechanical integrity after initial setting or hardening for long-term use (preferably 100's of hours, and more preferably 1000's of hours) at operational temperatures (e.g., at or above about 300° C.). Suitable polymers or resins do not exhibit substantial decomposition and do not exhibit substantial deformation at selected operational temperatures.

Organic polymers and more specifically organic resins for impregnation or blocking of pores of a porous support should have a viscosity which allows the polymer or resin to freely flow into support pores. Preferred polymers or resins have viscosities in the range of about 100 to 1000 centipoise and meet this requirement. The polymer or resin system used to block pores must have a suitable "working life" during which the viscosity remains sufficiently low before the polymer or resin set or hardens in order to flow into pores over the surface or surfaces of the support that will be exposed to gases. The length of this working life is particularly important when blocking pores over a large surface area. Resins that exhibit low viscosity over a long time period (1–60 hrs) are preferred in this application.

Polyimides (see Ghosh and Mittal (1996) and/or Wilson & Stenzenberger (1990)) are a class of polymeric materials solvent free processing. These resins have glass transition temperatures of 298° and 330° C., respectively and are examples of polyimide resins exhibiting a glass transition temperature of about 300° C. or more. Long-term use for greater than 1000 hours at temperatures of 288° C. in air has been demonstrated for these exemplary resins.

PETI-298 and PETI-330 are copolymers prepared from 1,3-Bis(4-aminophenoxy) benzene, (1,3,4-APB)3, 4'-oxydianiline, (3,4'-ODA), 3, 3',4, 4'-biphenyl tetracarboxylic dianhydride, (s-BPDA) and end-capped with 4-phenylethynylphthalic anhydride (4-PEPA):

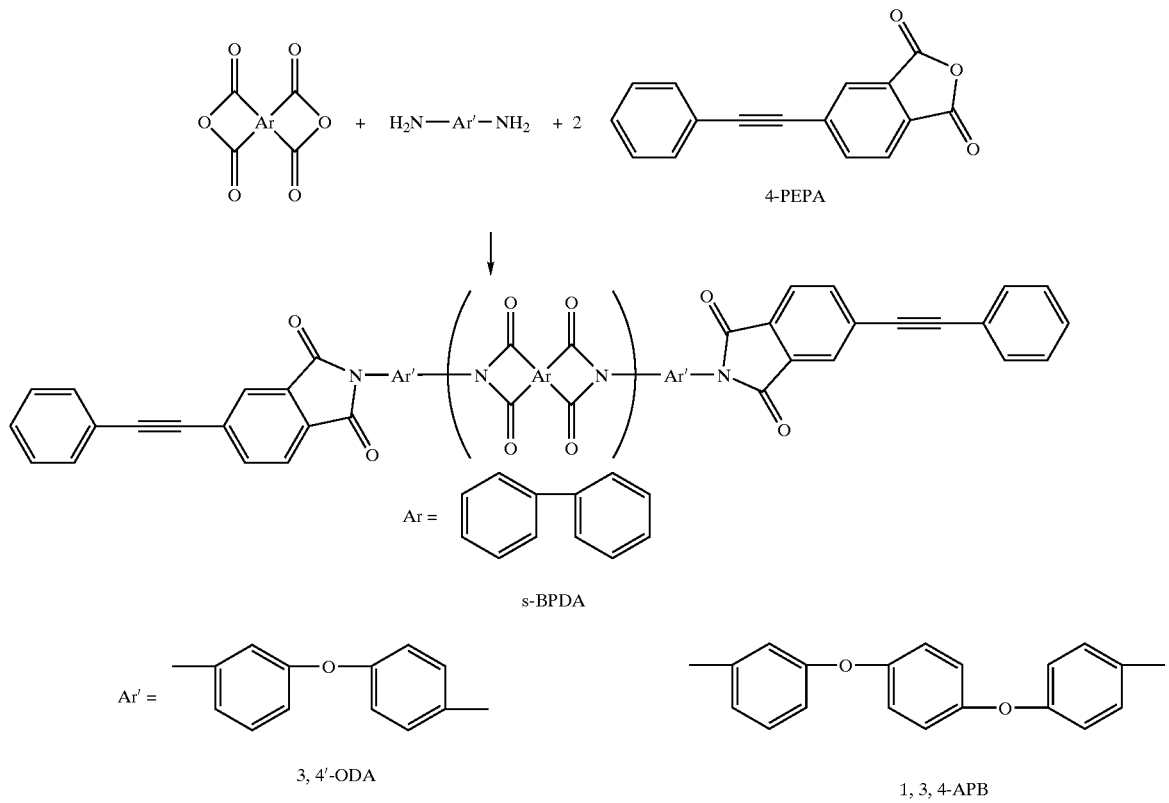

Scheme 1:
Structures of exemplary PETI polyimides which have found widespread use in a number of high-temperature applications, including aerospace structural and engine parts, automotive exhaust and engine components and industrial parts exposed to high temperatures, including some electronic components. Polyimides exhibiting stability and mechanical integrity at operational temperature, e.g., above about 300° C. are specifically useful for forming membrane support materials. Polyimides which in addition exhibit sufficiently low melt viscosity to flow and facilitate impregnation of a porous substrate are useful for blocking pores in the membranes of this invention.

Some polyimides have been developed which have viscosities that make them particularly suitable for impregnation of porous substrates. Moreover, these materials display excellent mechanical properties at elevated temperatures. PETI-298 and PETI-330 polyimide resins available from Eikos Inc., exhibit low and stable melt viscosities and offer Solvent borne polyimides are also commercially available as 50% solid solutions. These polyimides are typically rated for higher temperature use than neat melt processable polyimides. Polyimide resins such as RP46 (Unitech, LLC. Hampton Va.), a PMR-type polyimide(see U.S. Pat. No. 5,171,822 (Pater)) and the Skybond (TM) 700 series (IST, Industrial Summit Technologies, Japan) of aromatic polyimides (available as solutions of polyimide precursors) have been recommended for use at 370° C. and 350° C., respectively. Methods for forming resin elements employing these and other resins, particularly polyimide resins are known in the art.

Porous polymers for use as supports or carriers in membranes of this invention can be made, for example, by co-polymerizing a polyimide (or other highly thermally stable polymer or resin) with a thermally labile material such as polystyrene, polypropylene oxide, or a polymethyl methacrylate.

In one general embodiment, a porous support matrix of ceramic or material other than the metals or metal alloy which are permeable to hydrogen, is fabricated separately, and the pores are then blocked with a metal or alloy, which is permeable to hydrogen. As examples, porous alumina is fabricated first, then pores are blocked by mechanically clamping thin metal or alloy foils (e.g., of V, Nb, or Ta or their alloys) on to or between porous ceramic (e.g., alumina) or using a commercial high temperature ceramic paste or adhesive (e.g., alumina adhesive) to form a bond between the foil and ceramic substrate. Further examples include electroless deposition of palladium or other hydrogen-permeable metals or alloys into porous perovskite materials, which are lattice matched to the palladium or other metal or alloy.

In another embodiment, (see FIG. 1) fine powders of V, Nb, Ta, Zr, Pd, and their alloys are mixed with fine powders of ceramic, and are then pressed and sintered to form dense cermets. Preferably continuous matrices of both metal and ceramic are formed in the cermet after the material is sintered to facilitate hydrogen-permeability. Powders of metal (preferably from about 40-about 60 vol %) mixed with a ceramic provide a cermet that is hydrogen permeable. It is believed that the use of this range of metal and ceramic facilitates production of the desired continuous metal matrix. Again it is believed that the continuous matrix of the hydrogen-permeable metal provides permeability for hydrogen and allows transport of hydrogen, whereas the continuous phase of ceramic provides mechanical support and provides re-enforcement of the metals, which may become embrittled by hydrogen.

In certain embodiments, the ceramic employed is a proton conductor, such as a perovskite proton conductor, which may serve a dual purpose and may also transport hydrogen as well as act as a mechanical support. In the most preferred embodiments, the ceramic and metal of the cermets are lattice matched at the atomic level, in order to form a coherent interface between the ceramic and metal. Lattice matching minimizes interfacial stress. Interfacial stress can lead to the formation of dislocations which give rise to potential leak paths or which can initiate cracks. Specific combinations for the formation of lattice matched cermets include the following. Powders of niobium, tantalum or vanadium are mixed with powders of alumina and are sintered together to form dense cermets with minimum pore volume. In all of these cases the (011) crystallographic planes of the body centered cubic metals are very well lattice matched to the (1120) planes of the $Al_2O_3$. Thermal expansion is also very well matched in these combinations of metals and ceramic. In an additional example, a powder of palladium is mixed and sintered with a powder of the perovskite $LaFe_{0.9}Cr_{0.1}O_{3-z}$. (where z is a number that rendered the compound charge neutral). The (100) planes of the perovskite match the (100) planes of the palladium, as do other planes of low Miller index, i.e. (111) and (110).

In another general embodiment, (see FIG. 2) powders of V, Nb, Ta, Zr, Pd, and their alloys are first sintered together to form a porous material. Pores are then blocked to make the membrane impervious to gases other than hydrogen. In the simplest embodiment, thin foils of the hydrogen permeable metals, V, Nb, Ta, Zr, Pd, and alloys thereof, are placed atop porous material of the identical composition.

Use of identical materials in both thin foil and porous support ensures identical lattice constants in both materials. This allows ultimate lattice matching between foil and porous support. Thermal and chemical expansion are also preferably well matched compared to membranes made using dissimilar materials. Use of identical material in foil and support also eliminates interdiffusion problems between foil and support.

As a specific example of this general embodiment, a thin foil of dense vanadium is supported by a substrate of porous vanadium. The thicker porous vanadium mechanically supports the thin foil of vanadium. In a similar manner, thin foils of Nb, Ta, Zr, Pd, and their alloys are supported by porous substrates of Nb, Ta, Zr, Pd, and their alloys, respectively. Use of identical metal and metal alloy materials in both thin foil and porous substrate is an advance over prior art. For example, in prior art membranes, thin foils of palladium and palladium alloys can be supported atop porous stainless steel or Inconel or atop metal or ceramic gauzes. The foil and substrate were not lattice matched and the benefits of lattice-matching were not discussed. Furthermore, in a number of prior art membranes, interdiffusion between metals in the foils and support is reported to be a problem. However, when temperatures less than about 350° C. are used interdiffusion is not believed to be a significant problem.

Figure 2:
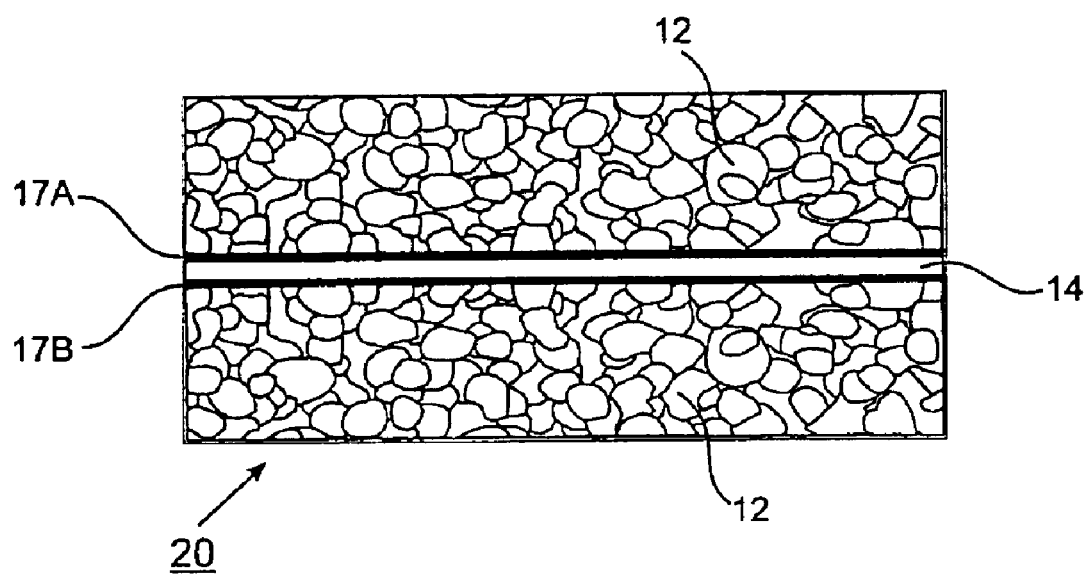
FIG. 2 illustrates an exemplary membrane (20) of this invention with a dense hydrogen-permeable metal layer (e.g., a thin metal foil layer) (14) between two porous support layers (12). Again two catalyst layers 17A and 17B are positioned on either side of the metal layer in contact with the surface of the porous support.

In a variation of the membrane of FIG. 2, the thin foil may be sandwiched between two porous layers as shown in FIG. 3. The thin foil may be located in the center of the composite, but position of the foil is not limited to the center. Depending upon relative rates of diffusion, in many cases it may be preferred that a thicker porous layer face the hydrogen source and that a thinner porous layer face the hydrogen sink side of the membrane or visa versa. Another variation is use of asymmetric porous layers, in which pore size, porosity, and thickness of the porous layers vary on the two sides of the membrane. In general, the larger pores and greater porosity may provide benefit when positioned on the hydrogen feed side of membranes since this side of the membrane will become contaminated with gases other than hydrogen (e.g., CO, $CO_2$, $H_2O$, etc.). However, the benefit of the use of different size pores on membrane surfaces will vary with the application in which the membrane is employed.

In a second general embodiment (of first forming the porous matrix of hydrogen permeable metal), fabrication of membranes is not limited to use of thin foils of hydrogen permeable metals to block pores of the porous metal substrate. Pores may also be blocked with hydrogen permeable metals using standard methods of sputtering or chemical vapor deposition. For example, vanadium, niobium or tantalum may be sputtered onto one surface of porous vanadium, niobium or tantalum substrates, respectively. The thin, dense film of metal is deposited with sufficient thickness (0.25 to 25 microns or more) to block flux of gases other than hydrogen. As examples of chemical vapor deposition, niobium metal may be deposited to plug pores of porous sintered niobium substrates by using $NbCl_5$ or $NbBr_5$ vapors reduced to niobium metal by the reactions: $2\ NbCl_5 + 5\ H_2 \rightarrow 2\ Nb + 10\ HCl$ and: $2\ NbBr_5 + 5\ H_2 \rightarrow 2\ Nb + 10\ HBr$. The reactions are allowed to proceed until the pores are plugged with niobium to such an extent that the membrane is made impervious to gases other than hydrogen. In formation of thin films by either sputtering or by chemical vapor deposition, continuous thin films of metal are deposited atop the porous substrates, and the majority of pores within the substrate remain open. Because the materials of the thin film and porous substrate are identical, lattice matching is perfect. This not only minimizes stress at the interface between deposited film and substrate, but also enhances nucleation and growth of the films and the substrate.

In a further variation of the second embodiment (of first forming the porous matrix of hydrogen permeable metal, followed by blocking of the pores), fine powders of V, Nb, Ta, Zr, Pd, and their alloys are again sintered first to form a porous matrix. Sintering aids such as yttria and silica maybe added prior to sintering ceramics. Pores of the metal matrix can be blocked by-materials that are not hydrogen-permeable i.e., materials other than V, Nb, Ta, Zr, Pd, and their alloys or by hydrogen-permeable ceramic materials. Materials used to plug the pores can include ceramics, glasses, metals, metal alloys, various inorganic materials, and organic polymers that are not permeable to hydrogen or with metals or metal alloys that are permeable to hydrogen. As specific examples, aluminum oxide is used to plug the pores of V, Nb or Ta. Aluminum oxide is deposited into the pores of the matrix using chemical vapor deposition. Aluminum chloride or organo-metallic compounds of aluminum are used as precursor compounds for aluminum oxide. Alternatively, aluminum metal is evaporated or sputtered onto porous V, Nb or Ta, or molten aluminum metal is allowed to infiltrate pores of these metals. Reaction of aluminum with oxides of V, Ta and Nb present on the surface of the porous substrates or with oxygen present in the gas phase during deposition, forms alumina, which is well lattice matched to both aluminum and to V, Ta and Nb. Excess, unreacted aluminum metal may remain as well.

Figure 4:
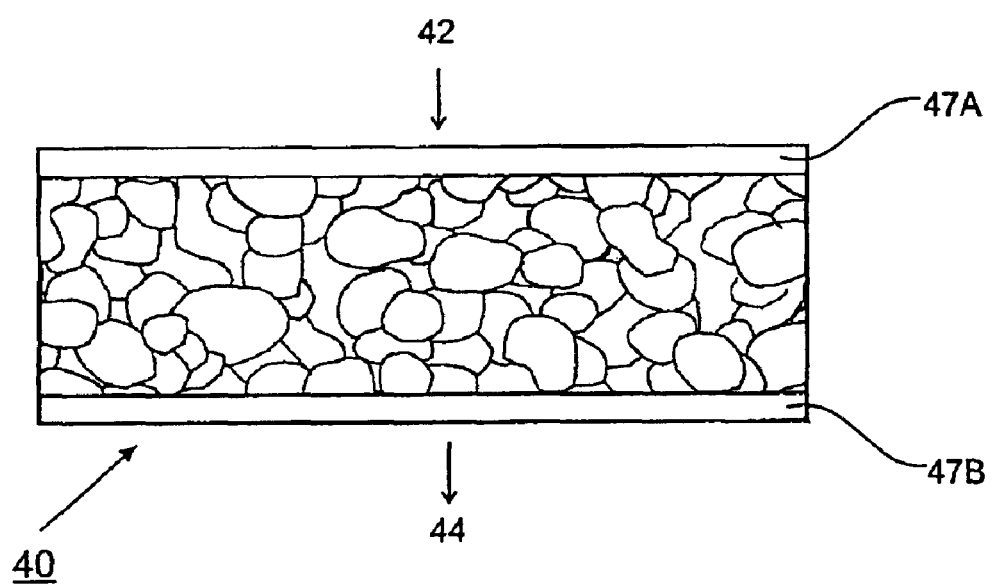
FIG. 4 illustrates another exemplary membrane (40) which is a cermet. The membrane is formed as a cermet of a hydrogen-permeable metal or alloy and a ceramic material. The figure also illustrates positioning of a membrane in a reactor for hydrogen separation with one surface of the membrane contacting a hydrogen source (42) and the other surface of the membrane contacting a hydrogen sink (44). The membrane separated the hydrogen source from the hydrogen sink (sealing mechanism is not shown). Hydrogen is selectively transported through the membrane from the source to the sink to effect hydrogen separation from source gases. A catalyst for adsorption and dissociation of molecular hydrogen (47A) can be provided on the hydrogen source surface of the membrane and a catalyst for desorption of hydrogen (to ease desorption) (47B) can be provided on the hydrogen sink surface of the membrane. In a preferred embodiment the cermet consists essentially of V, Nb, Ta Zr or alloys thereof and alumina (particularly α-alumina). In another preferred embodiment the cermet consists essentially of Pd or an alloy thereof and a perovskite such as $La_xSr_{1-x}CoO_{3-z}$ (where 0.4>x>0.8) or $La Fe_{1-y}Cr_yO_{3-z}$ (where 0>y>1) and z is a number that renders the compound charge neutral. The preferred cermet membrane is coated on both sides preferably with Ni, Pd or alloys thereof or with Pt, Ir, Rh or alloys thereof.

The materials plugging the pores may penetrate the entire porous matrix, as in FIG. 4, or may be limited to a thin layer. Material penetrating the entire porous matrix aids mechanical stability of the sintered metal matrix and provides support for the metal matrix which may become embrittled by hydrogen.

To prepare a porous perovskite material such as $La_{0.5}Sr_{0.5}CoO_{3-z}$, for example, quantities of $La_2O_3$, $SrCO_3$ and $Co_3O_4$ are weighed so as to give molar ratios of La:Sr:Co of 0.5:0.5:1. Atomic ratios in the general formula $La_xSr_{1-x}CoO_{3-z}$ are varied by varying the molar ratios of $La_2O_3$, $SrCO_3$ and $Co_3O_4$ in the initial starting materials. For example, to produce the compound $La_{0.8}Sr_{0.2}CoO_{3-z}$, the starting quantities of $La_2O_3$, $SrCO_3$ and $Co_3O_4$ are weighed so as to give molar ratios of La:Sr:Co of 0.8:0.2:1.

In a similar manner other perovskite materials of various composition are synthesized. Powders of the starting materials are thoroughly mixed and crushed in a ball mill. The solid state reactions are initiated by heating the mixed powders to 1200° C. for 12 hours in a furnace. The interior of the furnace is exposed to an atmosphere of air. X-ray powder diffraction is used to verify production of the desired perovskite crystal structure and the absence of the initial starting materials or other undesired intermediate products. If x-ray diffraction indicates that the reaction is not complete, the powder is re-ground and the heat treatment repeated until X-ray powder diffraction indicates only the desired perovskite phase.

Once powders of $La_{0.5}Sr_{0.5}CoO_{3-z}$ are synthesized, they are ground in a particle attritor until mean particle size, as indicated by commercial laser diffraction particle size analyzers, indicate that the median particle size is 750 nm or less. A slurry of the particles is then formed by mixing the powder in a solvent containing a 4:1 ratio, by mass of toluene:ethanol, containing 1–8% by mass polyvinylbutyral particle binder. Particle to solvent ratio is adjusted by varying the powder to solvent mass ratio until the slurry has a viscosity near 10 mPa·s. The slurry for a paint which can be applied to various substrates by the usual techniques of painting, including spraying, pouring, application with brushes or similar tools, and by dip-coating in which the substrate is immersed into the slurry and then withdrawn. Thickness of the coating is varied by varying the viscosity of the slurry, which in turn is varied by changing the ratio of powder to solvent and polyvinylbutyral particle binder.

The substrate can be ceramic, metal or metal alloy, for example, porous alumina or other porous ceramic material such as magnesia. Alternatively, the perovskite powder can be formed into porous tubes, disks and other forms without using a substrate.

The slurry is allowed to dry. The material is then heated in air to temperatures which burn away the particle binders and allow particles to sinter together, without closing the pores. The material is typically heated to 550° C. for two hours to burn away the particle binders, and then heated at 900–1000° C. for two hours to sinter the particles. Temperature can be routinely adapted for use of other carriers.

After the porous ceramic substrate is formed, the pores are plugged at least in part with a metal or metal alloy. In one preferred embodiment, palladium is deposited into the pores or the ceramic by chemical vapor deposition. In one method, palladium acetylacetone is vaporized at 400° C. and streamed past one side of the porous membrane, also kept above 400° C. Hydrogen or other gaseous reducing agent is streamed past the opposite side of the membrane. The gases interdiffuse in the pore and react, depositing palladium in the pores. Reaction is allowed to proceed until the pores are plugged (hydrogen permeable, but impermeable to gases other than hydrogen), as evidenced by blockage of an inert gas such as nitrogen or argon, as indicated by gas chromatography.

Alternatively, other volatile compounds of palladium can be streamed past one side of the membrane and decomposed in the pores. $PdCl_2$ is reacted with a stream of flowing CO at 140–290° C. to form a volatile palladium carbonyl, chloride, $Pd(CO)Cl_2$. The later compound is carried by the CO gas past one side of the membrane. This compound is decomposed on the ceramic substrate by heating the substrate to above about 300° C. Alternatively, hydrogen can be streamed past the opposite side of the porous membrane to reduce and decompose the palladium compound and to deposit palladium in the pores. Decomposition is allowed to proceed until the pores are plugged, as indicated by failure to detect CO by gas chromatography on the side of the membrane opposite to the CO carrier gas. Metals other than palladium, including Ni, Co, Fe, Ta, Nb, V and Mo, are deposited in the pores of the ceramic substrates by standard methods of chemical vapor deposition.

Pores of porous ceramics, including perovskites, can also be blocked with metals, such as palladium using electroless deposition. For example, Pd can be deposited into pores using $PdCl_2$ and $N_2H_2$ as a reducing agent.

Alternatively, metals are deposited in the pores of the ceramic by precipitating the metals from aqueous salt solutions or from other soluble compounds in various solvents. In one example, a saturated solution of palladium chloride is placed on one side of the membrane and a water soluble organic reducing reagent placed on the opposite side of the membrane. The reagents interdiffuse through the pores, react, and deposit palladium in the pores. Reaction is allowed to proceed until the pores are plugged. Other water soluble compounds of palladium, such as palladium nitrate are also used. The systems need not be limited to aqueous solvent. Compounds of palladium, such as palladium acetylacetonate can be dissolved in methanol or other solvent and reacted with organic reducing agents in organic solvents by interdiffusion.

Alternatively, compounds of palladium dissolved in aqueous or non-aqueous solvents are allowed to diffuse into the pores and precipitate in the pores. For example, saturated aqueous solutions of nitrates or halides of palladium are placed on one side of the membrane. Concentrated solutions of salts such as NaCl or NaNO$_3$ containing Cl$^-$ or NO$_3^-$ are placed on the opposite side of the membrane. The salts are allowed to interdiffuse and the palladium nitrate or halide (or similar compound) allowed to precipitate in the pores. The compounds are decomposed thermally at about 600° C. in air to deposit the palladium.

Methods as described herein for introducing metallic layers into porous ceramics can be applied to the introduction of such layers into porous metal or metal alloy carriers.

Thickness of the metals deposited in the pores of the ceramic substrates can be measured, for example, using images obtained with scanning electron microscopy. To conserve metal and maximize diffusion of hydrogen, it is desired that the thickness of the metal be less than 1 micron. In general, it is desired that the metal deposits be as thin as possible, so long as all of the pores are plugged and the membrane is reasonably impervious to all gases other than hydrogen. Low leakage levels of other gases is not desirable, but may be tolerated dependent upon the application in which the membrane is employed. The preferred and practical thickness range of metallic layers is about 0.1 to about 150 microns.

Figures 5A, 5B:
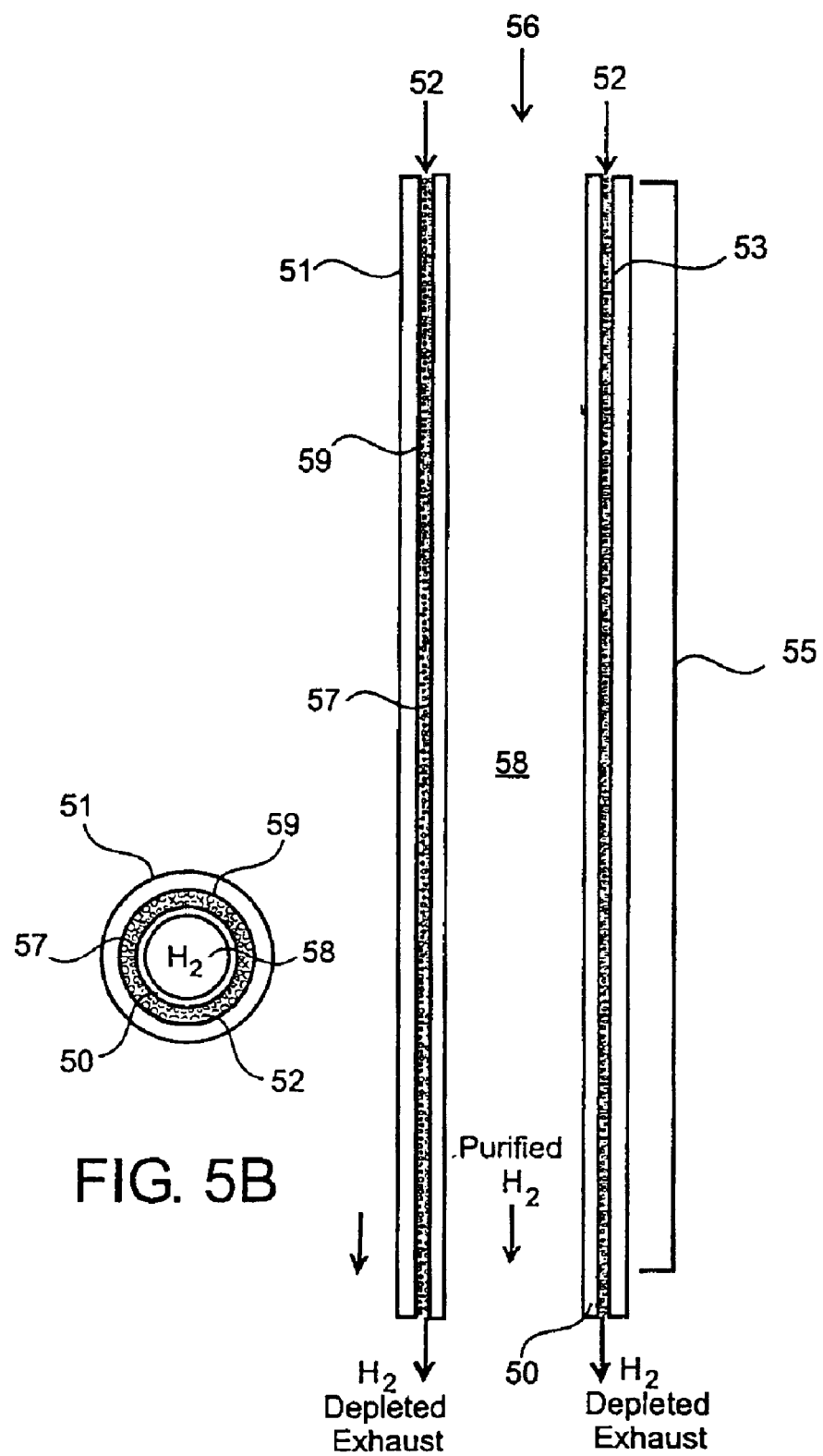
FIG. 5A illustrates a longitudinal cross-section of a tubular-shaped (or pipe) membrane for hydrogen separation (50). The membrane is illustrated for separation of hydrogen from gases generated in a heated water-gas-shift reaction zone (55). In this illustration the source gas is a water-gas-shift mixture (52) which contacts the outer surface (53) of the membrane tube. The membrane is held within a metal alloy pipe (51) which forms reactor walls. Gas inlets and outlets and seals are not illustrated. A sweep gas (56) is introduced into the tube (58). A water-gas-shift catalyst is provided in a bed (59) in contact with the outer surface of the membrane and a water-gas-shift catalyst layer (57) is provided on the outer surface of the membrane tube. Separated, purified hydrogen passes through the membrane and is swept out of the membrane reactor for collection.
FIG. 5B illustrates an axial cross-section of the membrane of FIG. 5A.
Figure 6:
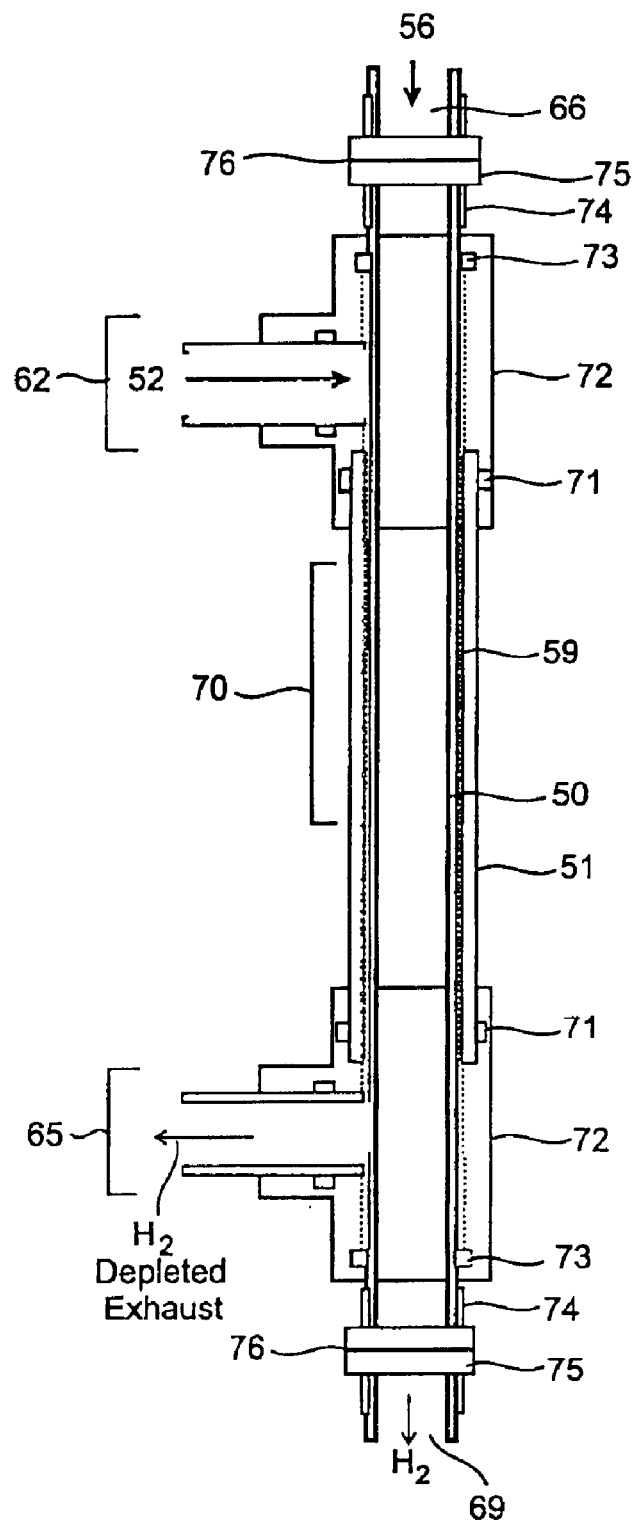
FIG. 6 illustrate in more detail the reachtor configuration for the tubular membrane of FIGS. 5A and B. The figure illustrates the source gas inlet (62), the sweep gas inlet (66), the outlet for hydrogen-depleted exhaust (65) and the outlet for purified hydrogen (69). The water-gas-shift zone of the reactor is illustrated (70). Other reactor elements discussed for FIG. 6A and B are illustrated. In addition, metal ferrules (71), metal alloy pipe fittings (72), ferrules (73), metal-ceramic seals (74) are indicated to illustrate how the membrane tube is sealed within the reactor tube and how the reactor gas inlets and outlets are formed. Metal alloy flanges (75) with metal gasket seals (76) form the connection between the sweep gas source and the purified hydrogen outlet.

The hydrogen-permeable composite membranes of this invention are particularly useful in membrane reactors for hydrogen separation. FIGS. 5A and B and 6 illustrate an exemplary reactor for hydrogen separation which illustrates a ceramic-metallic layer composite membrane. In the membrane configuration of FIGS. 5A and B (in which gas inlets and outlets are schematically illustrated by arrows), a water-gas-shift mixture is the hydrogen source. The water-gas-shift mixture passes through a water-gas-shift catalyst bed (such as are known in the art) in contact with the composite hydrogen-permeable (and impermeable to gases other than hydrogen). Hydrogen passes through the tubular membrane on application of a pressure gradient across the membrane and purified hydrogen is swept out of the reactor in a sweep gas. The hydrogen-depleted water-gas-shift mixture is exhausted from the reactor. FIG. 6 illustrates a reactor containing the membrane configurations of FIGS. 5A and B.

Figure 7:
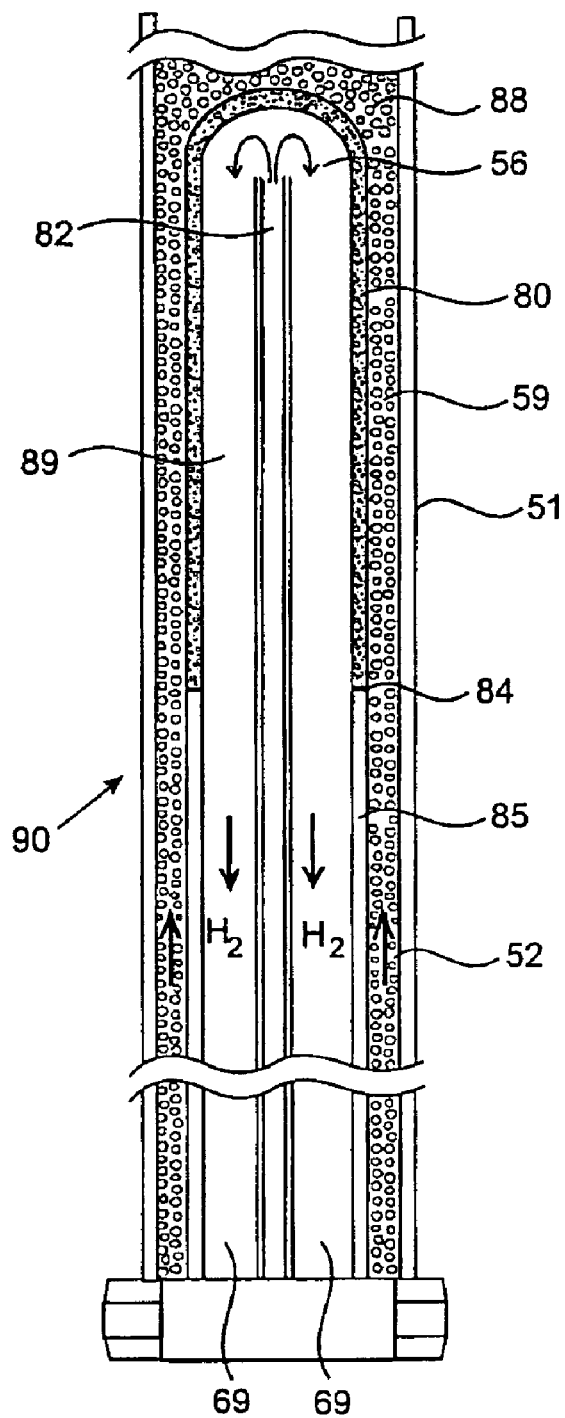
FIG. 7 illustrates another exemplary catalytic reactor (90) for hydrogen separation employing a closed ended (one-end closed) tube (80). The closed ended tube (80) is fused (84, using a ceramic seal) to a dense ceramic tube (85). Water-gas-shift mixture (52) is introduced to the reactor chamber (88) in contact with the outer surface of the membrane (the hydrogen source). The sweep gas (56) is introduced into the reactor chamber (89) in contact with the inner surface of the membrane (the hydrogen sink). A bed of water-gas-shift catalyst (59) is provided in contact with the outer surface of the membrane. Hydrogen permeates through the membrane to provide purified hydrogen which is carried to collection by the sweep gas. The outer surface of the membrane may also be coated with a layer of a water-gas-shift catalyst. Gas inlets and outlets and seals are not specifically shown. The reactor is sealed with a high-pressure seal to gas inlet and outlet lines.

FIG. 7 illustrates an alternate "closed-ended" tube (one end of the tube is closed) variation of the membrane of this invention. In this exemplary membrane the composite membrane of this invention (again exemplified by a metal-ceramic composite) is fused with a ceramic seal to a dense ceramic tube. Water-gas-shift mixture is again passed through a bed of water-gas-shift catalyst and in contact with the composite membrane. Hydrogen passes through the composite membrane and is swept out of the reactor with a sweep gas (e.g., an inert gas). The dimensions of the membrane (length, width or diameter of tubular membranes) are selected such that the membrane can withstand the reaction conditions applied (e.g., temperature and pressure differential applied across the membrane). Hydrogen generated in such reactors can be employed for various chemical reactions or can be used as a fuel. The illustrated reactors employ a sweep gas to remove purified hydrogen from the reactor. The hydrogen generated can be coupled into another reactor for use in chemical reaction or to generate useful energy. U.S. Pat. Nos. 6,281,403; 6,037,514 and/or 5,821,185 provide examples of reactions of membrane generated hydrogen. Those of ordinary skill in the art will recognize that membrane reactors for hydrogen separation can be combined with various known catalytic and catalytic membrane reactor systems for chemical reaction of hydrogen and to generate useful energy. The membranes of this invention can be employed in various membrane reactor designs and configurations known in the art.

The membranes of this invention can be formed into various sizes and shapes for use in the various membrane reactor configurations and structures known in the art.

In certain embodiments hydrogen-permeable ceramic materials, e.g., certain perovskites, can be employed in the membranes of this invention. The use of hydrogen-permeable ceramic materials is generally more beneficial to achieve increased hydrogen flux through a membrane when high temperatures (over about 500° C., about 500° C. to about 950° C.) are employed. In general, ceramics, particularly perovskite ceramics, capable of hydrogen transport will exhibit hydrogen transport at operating temperatures above 500° C. At lower temperatures, in general, the ceramic will not contribute significantly to hydrogen flux and the ceramic will function in the membrane to provide mechanical support.

In preferred embodiments, the materials employed in the membranes of this invention are selected to minimize thermal expansion mismatch. Table 5 lists coefficients of thermal expansion for some selected temperatures for the hydrogen permeable metals, Ta, Zr, Nb, V, Pd, Fe and Ni, and some common oxide supports. In general, it is preferred to select combinations of materials for membranes of this invention in which the coefficients of thermal expansion of all materials used in the membrane differ from each other by less than about 10%. However, differences up to about 30% may be tolerable for practical application, depending upon the specific membrane and reactor configuration employed, membrane or layer thickness, and operational temperature conditions, e.g., temperatures employed and the rate of heating or cooling of the membrane, etc.

TABLE 5

Coefficients of Thermal Expansion (×10$^{-6}$) for Matching Hydrogen Permeable Metals to Ceramics

| Temp (K.) | CaAl$_2$O$_4$ | ZrO$_2$ | Ta | Zr | Cr$_2$O$_3$ | Al$_2$O$_3$ | Nb | MgAl$_2$O$_4$ | TiO$_2$ |
|---|---|---|---|---|---|---|---|---|---|
| 600 | 6.4 | 6.7 | 6.9 | 7.1 | 7.8 | 7.9 | 8.0 | 8.4 | 8.8 |
| 700 | 6.8 | 6.5 | 7.1 | 7.6 | 7.6 | 8.2 | 8.1 | 9.1 (800) | 9.1 |
| 1000 | 7.8 | 6.9 | 7.3 | 8.2 | 7.3 | 9.1 | 8.6 | 9.8 | 9.7 |
| 1400 | 8.3 (1300) | 11.6 | 7.7 | 9.5 | 7.8 | 10.1 | 9.2 | 10.9 | 11.1 |

| Temp (K.) | V | SrTiO$_3$ | BaTiO$_3$ | Fe$_2$O$_3$ | MgO | Pd | Fe$_3$O$_4$ | Fe | Ni |
|---|---|---|---|---|---|---|---|---|---|
| 600 | 10.2 | 10.9 | 10.9 | 12.0 | 13.3 | 13.6 | 14.0 | 15.1 | 15.9 |
| 700 | 10.5 | 11.2 | 12.1 | 12.6 | 14.0 | 14.1 | 17.0 | 15.7 | 16.4 |

TABLE 5-continued

| Coefficients of Thermal Expansion (×10⁻⁶) for Matching Hydrogen Permeable Metals to Ceramics | | | | | | | | |
|---|---|---|---|---|---|---|---|---|
| 1000 | 11.6 | 12.0 | 14.7 | 13.8 | 15.0 | 15.6 | 24.0 (900) | 16.6 | 17.4 |
| 1400 | 13.6 | 13.3 | 16.0 | 14.5 | 16.0 | — | — | 23.3 (fcc) | 19.5 |

Table 6 lists thermal expansion mismatch between selected hydrogen permeable metals and common oxide substrates where thermal expansion mismatch is defined as the difference of coefficients of the overlayer minus the substrate divided by the coefficient of the substrate, (overlayer−substrate)/(substrate)×100%. This calculation of mismatch best applies to membranes having two components.

TABLE 6

| Thermal Mismatch % (Overlayer − Substrate)/(Substrate) × 100% | | | | | | | |
|---|---|---|---|---|---|---|---|
| Temp (K.) | Ta—CaAl$_2$O$_4$ | Ta—ZrO$_2$ | Zr—ZrO$_2$ | Ta—Al$_2$O$_3$ | Zr—Al$_2$O$_3$ | Nb—Al$_2$O$_3$ | Nb—MgAl$_2$O$_4$ |
| 600 | 7.8 | 3.0 | 6.0 | −12.7 | 10.1 | 1.3 | −4.8 |
| 700 | 4.4 | 9.2 | 17.0 | −13.4 | 7.3 | −1.2 | — |
| 1000 | −6.4 | 5.7 | 18.8 | −19.8 | 9.9 | −5.5 | −14.0 |
| 1400 | — | −33.6 | 18.1 | −23.8 | 5.9 | −8.9 | −15.6 |
| Temp (K.) | V—Al$_2$O$_3$ | V—SrTiO$_3$ | Pd—SrTiO$_3$ | Pd—MgO | Fe—Fe$_3$O$_4$ | Pd—Al$_2$O$_3$ | Pd—TiO$_2$ |
| 600 | 29.1 | 6.4 | 24.8 | 2.3 | 7.9 | 72.2 | 54.5 |
| 700 | 28.0 | 6.3 | 25.9 | 0.7 | 7.6 | 72.0 | 54.9 |
| 1000 | 27.5 | 3.3 | 30.0 | 4.0 | — | 71.4 | 60.8 |
| 1400 | 34.7 | 2.3 | — | — | — | — | — |

For those cases in which the metal is deposited in ceramic pores or a metal foil is applied to a ceramic support, the metal is the overlayer and the ceramic is the support. In the case of a cermet, the metal again is the overlayer and the ceramic is the support. This calculation of mismatch applies more specifically to membranes formed from cermets, by deposition of a metal layer on a porous ceramic or metal, or by the attachment or positioning of a metal foil on or between porous ceramic. Thermal expansion coefficients of other metals, metal alloys and various ceramic materials are known in the art or can be determined by methods well-known in the art.

Note from the last two columns of Table 6 that in palladium supported on either Al$_2$O$_3$ or TiO$_2$ that the mismatch of thermal expansion coefficients is very large compared to other values in the Table. For example, the pair Nb/Al$_2$O$_3$ has a thermal mismatch at 600 K of 1.3%; the pair Zr/ZrO$_2$ has a value of 6.0%. Vanadium alumina cermets exhibit thermal mismatch of 27.5 to 29.1% at operating temperatures between 600–1000 K. We have found, however, that vanadium alumina cermets exhibit reasonably long practical lifetimes during operation at temperatures between 600–1000K. Thus, materials exhibiting thermal mismatch of up to at least about 30% provide operational membranes. For membranes of this invention it is preferred that the materials employed in the membrane exhibit thermal mismatch, as defined for Table 6, of 30% or less. More preferred material combinations are those that exhibit thermal expansion mismatch as defined for Table 6 of 10% or less over the temperature range 600–1000K. Note that the high thermal mismatch values of palladium/alumina (71.4 to 72.2%) and palladium/titania (54.5 to 60.8%) over the temperature range of 600–1000K indicate that these materials will be more susceptible to damage or breakdown during operation at these high temperatures than other metal/ceramic combinations in Table 6.

EXAMPLES

V-Alumina Cermets. Fine powders of vanadium and alumina are mixed, pressed and sintered to form dense cermets, which are highly impermeable to gases other than hydrogen. Sintering is performed in a vacuum furnace at pressures of approximately 10 E-4 torr in order to minimize oxidation of the vanadium powder. Getters for oxygen, including Al, Mg and Zr, can also be added to the powder mixture. After sintering, material is mechanically removed from both sides of the membrane to expose fresh surfaces of vanadium. Palladium is deposited onto both sides of the membrane by sputtering. The palladium acts as a catalyst for dissociation of molecular hydrogen and also protects the vanadium from oxidation and formation of carbides and nitrides. In variations, the palladium may be deposited by evaporation, chemical vapor deposition, slurry-coating, or electroless deposition. In further variations, the catalyst may be Pt, Ir, Ni, Co, Fe, Mo, W, Rh, Cu, Ag, or compounds or alloys thereof, as well as Co—Mo, Fe$_3$O$_4$ and Fe$_3$O$_4$/Cr$_2$O$_3$ combinations (particularly 90 wt % Fe$_3$O$_4$/10 wt % Cr$_2$O$_3$.) In further variations, alloys of vanadium, in particular those of nickel and aluminum, are sintered with alumina in place of vanadium metal. Catalysts are applied as above. The (011) crystallographic planes of the body centered cubic vanadium are lattice matched to the (1120) planes of the Al$_2$O$_3$. Thermal expansion is also suitably matched.

Figure 8:
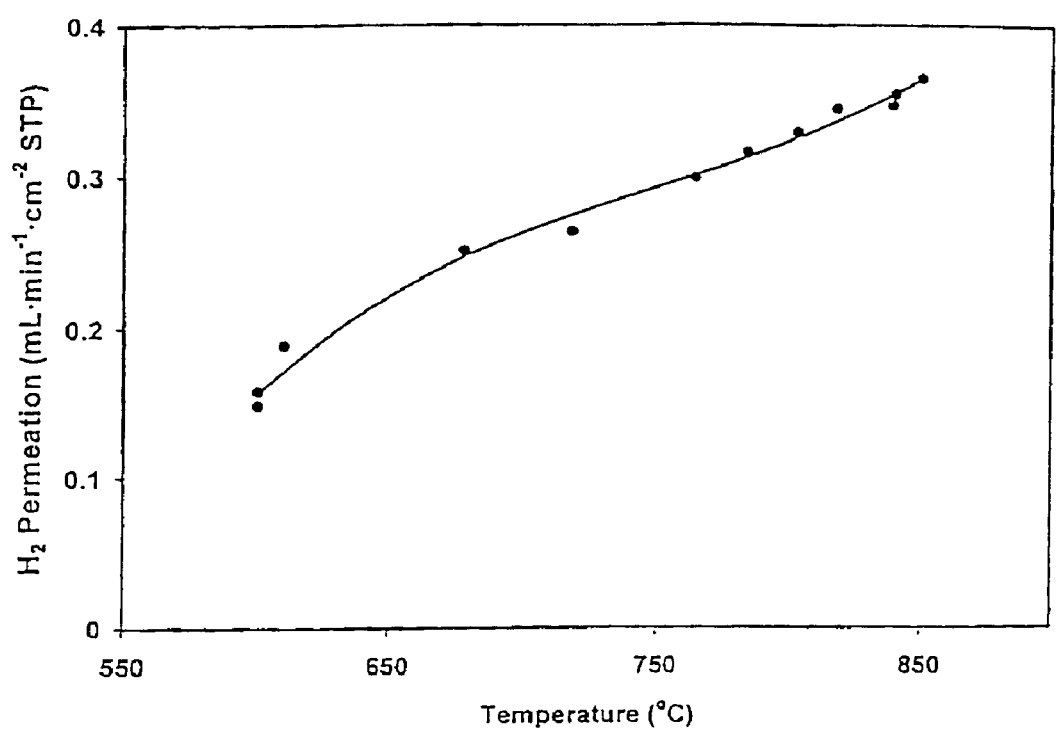
FIG. 8 is a graph of hydrogen permeation as a function of temperature for a 0.33 mm thick cermet membrane composed of 40 vol % V and 60 vol % alumina. The membrane was coated with a 0.5 micron layer of Pd catalyst on each side. The feed gas was 75 mL/min of 80/20 (v/v) $H_2$/He and the sweep gas was 150 mL/min Ar.

FIG. 8 is a graph of hydrogen permeation as a function of temperature for a 0.33 mm thick V/Al$_2$O$_3$ cermet disk membrane. The membrane was composed of 60 vol % Al$_2$O$_3$ and 40 vol % V. The membrane was coated with a 0.5 micron layer of Pd metal catalyst on both membrane surfaces. The feed gas was 75 mL/min 80/20 (v/v) H$_2$/He and the sweep gas was 150 mL/min Ar.

To compare hydrogen transport of different membranes, it is preferably to compare permeability of the membrane rather than permeation.

Nb-Alumina Cermets. Fine powders of niobium and alumina are mixed, pressed and sintered in a vacuum furnace to form dense cermets. Catalysts for hydrogen dissociation are applied as described for vanadium cermets. Getters for oxygen, including Zr, Mg and Al may be added to the powdered mixture. In variations, alloys of niobium, especially those of nickel and aluminum are used to form the cermets in place of niobium metal. The (011) crystallographic planes of the body centered cubic niobium are extremely well lattice matched to the (1120) planes of the $Al_2O_3$. Thermal expansion is also extremely well matched.

Ta-Alumina Cermets. Fine powders of tantalum and alumina are mixed, pressed and sintered in a vacuum furnace to form dense cermets. Catalysts for hydrogen dissociation are applied as described for vanadium cermets. Getters for oxygen, including Zr, Mg and Al may be added to the powdered mixture. In variations, alloys of tantalum, especially those of nickel and aluminum are used to form the cermets in place of tantalum metal. The (011) crystallographic planes of the body centered cubic tantalum are extremely well lattice matched to the (1120) planes of the $Al_2O_3$. Thermal expansion is also extremely well matched.

Zr-Zirconia Cermets. Fine powders of zirconium metal are mixed with fine powder of zirconia, and are sintered together in a vacuum furnace to form a dense cermet highly impervious to gases other than hydrogen. Catalysts are applied as in previous examples. In a variation, alloys of zirconium, especially with nickel are used to replace the pure zirconia metal in formation of the cermet. Thermal expansion of zirconium and zirconia are well matched.

Thin Foils of Vanadium Supported on Porous Alumina Substrates. Commercially available thin foils of vanadium are supported on porous alumina. Foils of vanadium that are guaranteed to be free of pinhole leaks ranging in thickness from about 70 to about 127 microns are commercially available. Thinner foils are available, but may not be guaranteed to be leak-free. The vanadium and alumina are matched for thermal expansion. Catalysts may be deposited onto both sides of the foil before the foil is placed on the alumina. The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation. In a variation, the vanadium foil may be placed between two layers of alumina. The porous alumina may be pre-fabricated or prepared by sintering powdered alumina (optionally employing sintering aids) and the foil placed on and attached or clamped to the alumina, or the alumina may be cast from an alumina paste or adhesive onto the foil. A commercial high temperature alumina paste or adhesive can be used to attach foil to ceramic. Other attachment or clamping methods are available in the art.

Figure 9:
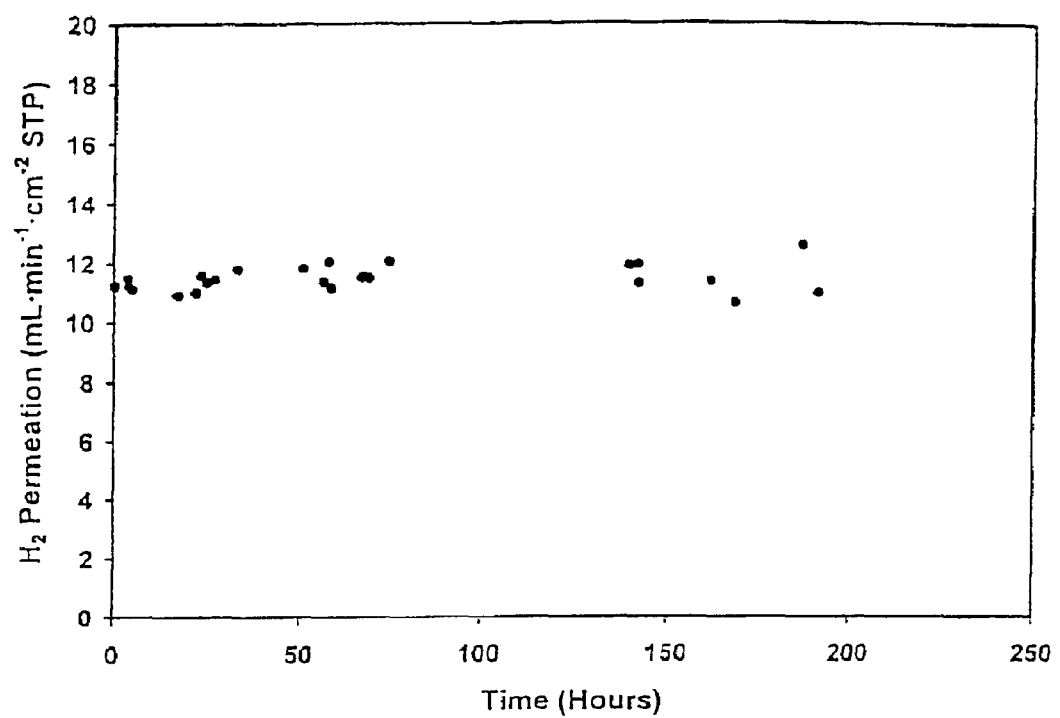
FIG. 9 is a graph of hydrogen permeation as a function of time at 320° C. for a 0.127 mm thick vanadium membrane with 0.5 micron thick catalyst layer (Pd) on both sides of the vanadium (foil) and a 1500 micron thick alumina ceramic cast onto the hydrogen feed side of the membrane (hydrogen source side of the membrane). The feed gas was 175 mL/min of hydrogen and 25 mL/min He. The sweep gas was 250 mL/min Ar. The average permeability was $P_{ave} = 6.4 \times 10^{-8}$ mol·m·m$^{-2}$·s$^{-1}$·Pa$^{-0.5}$.

FIG. 9 is a graph of hydrogen permeation as a function of time at 320° C. for an approximately 0.125 mm-thick vanadium membrane. The membrane was prepared by coating a vanadium foil on both sides with a 500 nm thick layer of palladium catalyst and supported by a 1500 micron thick porous alumina layer (porosity about 40–45%) formed by casting the alumina layer (using alumina cement) and curing the cement at 370° C.

Thin Foils of Niobium Supported on Porous Alumina Substrates. Commercially available thin foils of niobium are supported on porous alumina. The niobium and alumina are extremely well lattice matched and are extremely well matched for thermal expansion. Catalysts may be deposited onto both sides of the foil before the foil is placed on the alumina. The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation. In a variation, the niobium foil may be placed between two layers of alumina. The porous alumina may be pre-fabricated, and the foil placed on the alumina, or the alumina may be cast from an alumina paste or adhesive onto the foil.

Thin Foils of Tantalum Supported on Porous Alumina Substrates. Use of tantalum foil is a variation of the above methods using vanadium and niobium foils. The niobium and alumina are extremely well lattice matched and are extremely well matched for thermal expansion.

Thin Foils of Zirconium Supported on Porous Zirconia. This is a variation of the thin foil method above, but matches zirconia to zirconium.

Calculation of Lattice Matching of Nb, Ta and/or V to alumina and Zr to Zirconia. For niobium, tantalum and vanadium, which all have the body centered cubic lattice with cube edge distances of 3.30 Å, 3.30 Å and 3.04 Å at 298 K, respectively, lattice matching occurs on α-alumina with the bcc(110)//$Al_2O_3$(1120) and bcc[111]//$Al_2O_3$[0001]. Using a value of 4.76 Å as the lattice constant for α-$Al_2O_3$ along one of the a-axes on a (1120) face, and lattice parameters of 4.95 Å, 4.95 Å, and 4.56 Å, respectively for Nb, Ta, and V, in the direction perpendicular to the [111] in the bcc (100) plane, the mismatches for Nb, Ta and V at 298 K are 4.0%, 4.0% and −4.2%, respectively. For the [111] direction of the bcc(110) plane, lattice parameters of Nb, Ta and V are 5.716 Å, 5.716 Å and 5.265 Å, respectively. Two of these cube diagonal distances give 11.432 Å, 11.432 Å, and 10.53 Å, respectively for Nb, Ta and V at 298 K. Using a lattice parameter of 13.01 Å for α-$Al_2O_3$ along the c-axis, mismatches of 12.1%, 12.1% and 19.1% are found for Nb, Ta, and V, respectively.

For zirconium metal supported on cubic zirconia ceramic, lattice parameters are assumed to be a=3.229 Å and c=5.141 Å for hexagonal zirconium, and c=5.09 for cubic zirconia. For Zr(110)//$ZrO_2$(100) and Zr[0001]//$ZrO_2$[100], the misfit in the Zr[0001] direction is (5.141−5.09)/5.09×100%= 1.00%. For the perpendicular direction on the Zr(1120) a lattice parameter of 5.59 Å, matches the c-distance on cubic zirconia of 5.09 Å, with a misfit of (5.59−5.09)/5.09×100%= 9.8%.

Deposition of Niobium into the Pores of Alumina or onto Alumina by Chemical Vapor Deposition. To deposit niobium in the pores of alumina, the alumina is heated between 900–1300° C. Hydrogen is streamed past one side of the alumina and $NbCl_5$ vapor is streamed past the opposite side of the alumina. Partial pressures of both gases are kept at 1 atmosphere and below. The gases meet and react in the pores. Niobium metal is deposited in the pores by the reaction: 2 $NbCl_5$+5 $H_2$→2 Nb+10 HCl. The reaction is allowed to proceed until the pores are plugged.

Alternatively, niobium can be deposited in the pores using $NbBr_5$ vapor instead of $NbCl_5$. Hydrogen is streamed past one side of the alumina and $NbBr_5$ vapor is streamed past the opposite side of the alumina. The gases meet and react in the pores. Niobium metal is deposited in the pores by the reaction: 2 $NbCl_5$+5 $H_2$→2 Nb+10 HCl. The reaction is allowed to proceed until the pores are plugged.

The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation.

Deposition of Tantalum into the Pores of Alumina or onto Alumina by Chemical Vapor Deposition. Tantalum metal is deposited in the pores of alumina as follows. The alumina is heated in the temperature range of 900–1300° C. Hydrogen is streamed past one side of the alumina and $TaCl_5$ vapor is streamed past the opposite side, with partial pressures of both preferably near 10 torr. The gases interdiffuse in the pores and deposit tantalum by the reaction: $2\ TaCl_5 + 5\ H_2 \rightarrow 2\ Ta + 10\ HCl$. Alternatively the bromides or iodides of tantalum can be substituted for tantalum chloride. Catalysts are applied as described previously.

Deposition of Vanadium into the Pores of Alumina or onto Alumina by Chemical Vapor Deposition. This is a variation of the examples used for niobium and tantalum employing $VCl_4$ or other volatile compounds of vanadium.

Deposition of Vanadium onto Porous Alumina by Sputtering. A thin film of vanadium is deposited onto porous alumina by sputtering in vacuum. The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation.

Deposition of Niobium onto Porous Alumina by Sputtering. A thin film of niobium is deposited onto porous alumina by sputtering in vacuum. The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation.

Deposition of Tantalum onto Porous Alumina by Sputtering. This is a variation of the examples for sputtering vanadium and niobium onto porous alumina.

Deposition of Zirconia onto Porous Zirconia by Sputtering. This is a variation of the above sputtering techniques. Zirconium is matched to zirconia, rather than to alumina.

Deposition of Molybdenum onto Porous Alumina by Chemical Vapor Deposition. Molybdenum is deposited into the pores of alumina using chemical vapor deposition. A porous alumina tube is heated between 400–1350° C. Hydrogen is streamed past one side of the alumina and $MoCl_6$ vapor is streamed past the opposite side. Gas partial pressures are kept below 1 atmosphere, and preferably at less than 20 torr. The gases meet and react in the pores to deposit molybdenum metal in the pores by the reaction: $MoCl_6 + 3\ H_2 \rightarrow Mo + 6\ HCl$. The reaction is allowed to proceed until the pores are plugged.

Alternatively molybdenum metal is deposed by streaming hydrogen past one side of the alumina and $Mo(CO)_6$ past the opposite side. The alumina is heated between 450–700° C. and the $Mo(CO)_6$ thermally decomposes by the reaction: $Mo(CO)_6 \rightarrow Mo + 6\ CO$. The purpose of the hydrogen is to reduce contamination of carbon and oxygen in the molybdenum film. Partial pressures of the gases are both kept between 1 atmosphere and 1 torr.

Thin Foils of Vanadium Supported on Porous Vanadium Substrates. Powdered vanadium is pressed and sintered in a vacuum furnace to produce a stable material of porous vanadium. Commercially available thin foils of vanadium are supported on the porous vanadium. The vanadium and porous vanadium are perfectly lattice matched and are well matched for thermal expansion. Catalysts may be deposited onto both sides of the foil before the foil is placed on the porous vanadium. The catalyst may be Pd, Pt, Ir, Ni, Co, Fe, Mo, W, Rh, or compounds or alloys thereof, deposited by sputtering, evaporation, chemical vapor deposition, electroless deposition, electrochemical deposition, slurry-coating or chemical precipitation. In a variation, the vanadium foil may be placed between two layers of porous vanadium. In variations, the porous vanadium or foil may be replaced by alloys of vanadium, especially those of vanadium-nickel.

Thin Foils of Niobium Supported on Porous Niobium Substrates. This is a variation of the previous example, with niobium substituted for vanadium. In further variations, the porous niobium or foil may be replaced by alloys of niobium, especially those of niobium-nickel.

Thin Foils of Tantalum Supported on Porous Tantalum Substrates. This is a variation of the previous example.

Porous Vanadium as Support with Pores Blocked by Films of Vanadium Deposited by Sputtering or Chemical Vapor Deposition. Powdered vanadium is sintered to form a porous support. A thin film of vanadium is deposited onto the porous vanadium by chemical vapor deposition or sputtering as described for deposition of vanadium onto porous alumina. Catalysts are deposited as described previously. The vanadium is perfectly lattice matched to itself, and thermal expansion is well matched in addition.

Porous Niobium as Support with Pores Blocked by Films of Niobium Deposited by Sputtering or Chemical Vapor Deposition. This is a variation of the above example, with vanadium replaced by niobium.

Porous Tantalum as Support with Pores Blocked by Films of Tantalum Deposited by Sputtering or Chemical Vapor Deposition. This is a variation of the above two examples, with vanadium and niobium replaced by tantalum.

Porous Vanadium with Pores Blocked by Aluminum Oxide Deposited Chemical Vapor Deposition. Powdered vanadium is pressed and sintered in a vacuum furnace to produce a stable material of porous vanadium. Aluminum oxide is used to plug the pores of the porous vanadium. Aluminum chloride or organo-metallic compounds of aluminum are used as precursor compounds for aluminum oxide. Alternatively, aluminum metal is evaporated or sputtered onto porous vanadium or molten aluminum metal is allowed to infiltrate pores of vanadium. Reaction of aluminum with oxides of vanadium, present on the surface of the porous substrates or with oxygen present in the gas phase during deposition, forms alumina, which is well lattice matched to both aluminum and to vanadium. Excess, unreacted aluminum metal may remain. Aluminum metal may be used without intentional formation of aluminum oxide to block the pores of vanadium. Excess deposited material is mechanically removed to expose fresh vanadium material, and catalysts are deposited. In further variations, pure vanadium may be replaced with alloys of vanadium, especially those of nickel.

Porous Niobium or Porous Tantalum with Pores Blocked by Aluminum Oxide Deposited Chemical Vapor Deposition. These are variations of the above example with vanadium replaced by niobium or tantalum.

Porous Magnetite ($Fe_3O_4$) with Pores Blocked by V, Ta, Nb or Pd. Porous magnetite, which is a common water gas shift catalyst, or porous magnetite stabilized with chromium oxide, or the cobalt analogs of the water-gas shift catalysts, can be used as a mechanical support and also serve a duel purpose and act as a catalyst. Pores of the magnetite can be blocked by any of the methods outlined above for porous alumina, zirconia or porous metals.

Perovskite Materials. The perovskite material, $La_{0.5}Sr_{0.5}CoO_{3-z}$, is chosen as a substrate for Pd—Ag alloys because of the excellent epitaxial fit between Pd and $La_{0.5}Sr_{0.5}CoO_{3-z}$. X-ray powder diffraction patterns taken (Philips PW 1830 X-Ray Generator with Model 1050 Goniometer and PW 3710 Control Unit) of $La_{0.5}Sr_{0.5}CoO_{3-\delta}$ show that Pd and $La_{0.5}Sr_{0.5}CoO_{3-z}$ have all eight of their detected X-ray diffraction peaks in common and have at least eight identical crystal lattice constants. This implies that Pd has an almost perfect epitaxial fit on the surface of $La_{0.5}Sr_{0.5}CoO_{3-z}$ and that embedded Pd crystallites will have a near perfect endotaxial fit within pores of $La_{0.5}Sr_{0.5}CoO_{3-z}$. (Endotaxy refers to the oriented growth of one crystalline material as an inclusion within another, whereas epitaxy is the oriented overgrowth of one crystalline material atop another crystalline substance.) The near perfect epitaxial fit will minimize dislocations and defects at the Pd—$La_{0.5}Sr_{0.5}CoO_{3-z}$, interface and thus minimize pathways for leaks. The excellent endotaxial fit of Pd within the pores of the $La_{0.5}Sr_{0.5}CoO_{3-z}$ will minimize stress and initiation of micro cracks. Good lattice matches were found for Pd (and its alloys) with other perovskites, including $LaFeO_{3-z}$, $LaCrO_{3-z}$, mixtures of $LaFe_{1-y}Cr_yO_{3-z}$ (wherein 0>y>1), $BaTiO_{3-z}$, $CaTiO_{3-z}$, and $SrTiO_{3-z}$ (where z is a number that renders the compound charge neutral.)

Furthermore, the lattice constants of $La_{0.5}Sr_{0.5}CoO_{3-z}$, or other perovskite materials are varied through a wide range by varying the stoichiometry of the perovskite. This allows the lattice constants to be adjusted to accommodate alloys of palladium, cobalt, iron and nickel. Pd nano-crystallite catalysts can be deposited onto $La_{0.5}Sr_{0.5}CoO_{3-z}$ using $Pd(NO_3)_2 \cdot 2H_2O$ as a precursor. Likewise, deposition of Ni and Co nano-crystallites onto $La_{0.5}Sr_{0.5}CoO_{3-z}$ can be achieved using $Ni(NO_3)_2 \cdot 6H_2O$, and $Co(NO_3)_2 \cdot 6H_2O$ as precursors.

$La_{0.5}Sr_{0.5}CoO_{3-z}$, powder is made by calcining carbonates, nitrates and oxides of La, Sr and Co. The ratio of atoms of La:Sr:Co in $La_xSr_yCoO_{3-z}$ can be varied by simply changing the mass of La:Sr:Co in the starting materials. Variation of the stoichiometry of perovskites and creation of non-stoichiometric perovskite compounds to optimize various properties can also be readily performed. The perovskite powder forms when the mixture of compounds is calcined at 1200° C. The powder is then ground to submicron dimensions in a ball mill. X-ray powder diffraction is used to verify complete reaction to the desired perovskite phase. X-ray line broadening is also used to estimate particle size. Particle size distribution is also verified using laser diffraction and Scanning Electron Microscopy (SEM). Slurries of perovskite powders are made having the consistency of paint, and the perovskite material is applied to various surfaces, by painting, spraying, or dip-coating. In dip-coating, the substrate is simply immersed into the slurry of perovskite powder. By varying the viscosity of the slurry, the thickness of the coating is varied through a wide range, typically 3–6 μm thickness is sufficient for many applications.

Slurry-Coating of Porous Alumina Tubes with 3–6 μm Thick Layers of Nano-Porous $La_{0.5}Sr_{0.5}CoO_{3-z}$. Relatively large pores of porous alumina tubes are partially plugged by small nano-particles of $La_{0.5}Sr_{0.5}CoO_{3-z}$. The suspended particles of $La_{0.5}Sr_{0.5}CoO_{3-z}$ slurries form a paint. Alumina tubes are coated by simply pouring the slurry onto the walls of the tube. Capillary forces draw some of the slurry into the pores of the alumina. Excess slurry is drained from the walls of the tube, leaving the macropores of the alumina filled with the slurry. By adjusting the viscosity of the slurry, the coating of $La_{0.5}Sr_{0.5}CoO_{3-z}$ is reduced to a few microns in thickness. Surface tension tends to spread the coating into a film of very uniform thickness.

After evaporation of the toluene/ethanol solvent used in the slurry, the polyvinyl butyral particle binder in the slurry is burned away by heating 2 hrs at 550° C. in a temperature controlled ceramic furnace. This forms a porous bisque with particles slightly adhering to the alumina substrate. Once the binder is removed, the sample is heated to 900–1000° C. for 2 hours. This firmly sinters the particles of $La_{0.5}Sr_{0.5}CoO_{3-\delta}$ together within the pores of the alumina tube—while leaving nanopores between the particles. Sintering at 900–1000° C. firmly binds the particles together without over-sintering the particles and closing the pores and perovskite particles adhere reasonably well to alumina surfaces after sintering. These high temperatures are necessary because of the refractory nature of the oxides. Sintering above 1000° C. however, causes particle coalescence and closes the pores. FIG. 1 shows a nano-porous film of perovskite produced after sintering at 900° C.

Infiltration of Aqueous Pd, Co, Ni and Ag Nitrate Solutions into Nano-pores of $La_{0.5}Sr_{0.5}CoO_{3-z}$. The nano-pores of the $La_{0.5}Sr_{0.5}CoO_{3-z}$ shown in FIG. 1 are filled with nano-crystallites of Pd, Ni, Co and other silver alloys as well as Pd and Ni silver alloys coated with Co. Aqueous solutions of $Pd(NO_3)_2 \cdot 2H_2O$, $Ni(NO_3)_2 \cdot 6H_2O$, $Co(NO_3)_2 \cdot 6H_2O$ and $AgNO_3$ are allowed to infiltrate into the nano-pores of the $La_{0.5}Sr_{0.5}CoO_{3-\delta}$ shown in FIG. 1. The very fine nanopores create extreme capillary forces which draw the solutions into the pores. By using the Kelvin Equation to calculate pressures in fine capillaries, it is shown that capillary pressures of 1000 atmospheres are created in the pores between sub-micron size particles. Such forces draw the nitrate solutions into the pores and hold the liquid in place.

Reduction of the Nitrates into Pd, Co, Ni and Ag Nano-Particles. The metals are formed by the thermal decomposition of the nitrates in an inert atmosphere or by reducing the nitrates in hydrogen. The infiltration/decomposition/reduction procedure is repeated until the pores are plugged with metal nano-particles, and air leaks are stopped as indicated by gas chromatography. Silver is added to the hydrogen sink side of the Pd, Ni and Co particles by allowing an aqueous silver nitrate solution to infiltrate the hydrogen sink side of the membrane. The silver nitrate is reduced with an organic reducing agent to deposit metallic silver crystallites onto the hydrogen sink side of the membrane. Heating to 900° C. allows interdiffusion of the metals.

Deposition of Cobalt and Nickel Nano-Particles into the Pores of Sintered $La_{0.5}Sr_{0.5}CoO_{3-z}$ Powder. Thermal decomposition of the nitrates to the metals is fairly complete by 600° C. if a slightly reducing atmosphere of 10% by volume $H_2$ in argon is used. Results show that metallic particles of Pd, Ni and Co are easily and conveniently deposited in the pores of $La_{0.5}Sr_{0.5}CoO_{3-z}$.

Re-exposure of the membranes to oxygen in air at high temperatures can oxidize the surfaces of the trapped Co and Ni particles. However, these surface oxides are easily reduced when the membranes are in use and exposed to hydrogen at elevated temperatures.

Cobalt metal is added to the nano-porous $La_{0.5}Sr_{0.5}CoO_{3z}$ as follows. An appropriate mass of reagent grade cobalt(II) nitrate is weighed to produce a saturated aqueous solution of cobalt nitrate. The cobalt(II) nitrate is dissolved in de-ionized water which is then drawn into the nanopores of the $La_{0.5}Sr_{0.5}CoO_{3-z}$ by capillary action. The cobalt nitrate is reduced by heating at a rate of 1° C./min to 600° C. while flowing a gas mixture with 10% $H_2$ and 90% argon over the membrane in a temperature and atmosphere controlled reduction furnace. Oxides of cobalt which form upon exposure to air are reduced in the membrane reactor by exposure to hydrogen. The procedure for the deposition of nickel into the pores of $La_{0.5}Sr_{0.5}CoO_{3-z}$ is identical to that for cobalt, except that nickel nitrate is used as the precursor. The above reaction conditions are sufficient to reduce the cobalt and nickel oxides.

Those of ordinary skill in the art will appreciate that materials, methods, and procedures other than those specifically exemplified herein can be employed in the practice of this invention without resort to undue experimentation. All art-known equivalents of materials, methods and procedures that are described herein are intended to be encompassed by this invention.

REFERENCES

U.S. Pat. No. 2,824,620, Feb. 25, 1958, A. J. De Rosset, "Purification of hydrogen utilizing hydrogen-permeable membranes."
U.S. Pat. No. 2,958,391, 1960, A. J. De Rosset, "Purification of hydrogen utilizing hydrogen-permeable membranes."
U.S. Pat. No. 3,350,844, Nov. 7, 1967, Makrides, et al., "Separation of hydrogen by permeation."
U.S. Pat. No. 3,393,098, Jul. 16, 1968, A. J. Hartner et al., "Fuel cell comprising a hydrogen diffusion anode having two layers of dissimilar metals and method of operating same."
U.S. Pat. No. 4,313,013, Jan. 26, 1982, Harris, "Palladium or a palladium alloy hydrogen diffusion membrane treated with a volatile compound of silicon is used to separate hydrogen from a mixture of it with a hydrocarbon."
U.S. Pat. No. 4,468,235, Aug. 28, 1984, Hill, "Hydrogen separation using coated titanium alloys."
U.S. Pat. No. 4,496,373, Jan. 29, 1985, Behr et al., "Diffusion membrane and process for separating hydrogen from gas mixture."
U.S. Pat. No. 4,536,196. Aug. 20, 1985, Harris, "Coated diffusion membrane and its use."
U.S. Pat. No. 4,589,891, May 20, 1986, N. Iniotakis, C-B. von der Decken and W. Frohling, "Hydrogen permeating membrane, process for its manufacture and use."
U.S. Pat. No. 4,699,637, Oct. 13, 1987, Iniotakis, et al., "Hydrogen permeation membrane."
U.S. Pat. No. 5,139,541, Aug. 18, 1993, D. J. Bend, "Hydrogen-permeable composite metal membrane."
U.S. Pat. No. 5,149,420, Sep. 22, 1992, R. E. Buxbaum and P. C. Hsu, "Method for plating palladium."
U.S. Pat. No. 5,171,822, Dec. 15, 1992, R. Pater, "Low Toxicity High Temperature PMR Polyimide."
U.S. Pat. No. 5,215,729, Jun. 1, 1993, R. E. Buxbaum, "Composite metal membrane for hydrogen extraction."
U.S. Pat. No. 5,217,506, Jun. 8, 1993, D. J. Bend and D. T. Friesen, "Hydrogen-permeable composite metal membrane and uses thereof."
U.S. Pat. No. 5,259,870, Nov. 9, 1993, D. J. Bend, "Hydrogen-permeable composite metal membrane."
U.S. Pat. No. 5,393,325, Feb. 28, 1995, D. J. Bend, "Composite hydrogen separation metal membrane."
U.S. Pat. No. 5,498,278, Mar. 12, 1996, D. J. Bend, "Composite hydrogen separation element and module."
U.S. Pat. No. 5,738,708, Apr. 14, 1998, N. M. Peachey, R. C. Dye, R. C. Snow and S. A. Birdsell, "Composite metal membrane."
U.S. Pat. No. 5,821,185, Oct. 13, 1998, White et al., Solid State Proton and Electron Mediating Membrane and Use in Catalytic Membrane Reactors."
U.S. Pat. No. 5,931,987, Aug. 3, 1999, R. E. Buxbaum, "Apparatus and methods for gas extraction".
U.S. Pat. No. 6,037,514, Mar. 14, 2000, White et al., "Solid State Proton and Electron Mediating Membrane and Use in Catalytic Membrane Reactors."
U.S. Pat. No. 6,183,543, Feb. 6, 2001, R. E. Buxbaum, "Apparatus and methods for gas extraction".
U.S. Pat. No. 6,214,090, Apr. 10, 2001, R. C. Dye, and R. C. Snow, "Thermally tolerant multilayer metal membrane."
U.S. Pat. No. 6,281,403, Aug. 28, 2001, White et al., "Solid State Proton and Electron Mediating Membrane and Use in Catalytic Membrane Reactors."
U.S. Pat. No. 6,461,408, Oct. 8, 2002, Buxbaum, "Hydrogen Generator."
Other References
Amandusson, H. Dissertation No.651, "Hydrogen Extraction with Palladium Based Membranes," Institute of Technology, Linkopings Universitet, Department of Physics and measurement Technology, Linkoping, Sweden, (Forum Scientum, Linkoping, Sweden, 2000).
Benzinger, J. B. (1991) "Thermochemical Methods for Reaction Energetics on Metal Surfaces," in: Metal-Surface Reaction Energetics, Edited by E. Shustorovich, (VCH Publishers, Weinheim, Germany) pp. 53–107.
Beshers, D. N. (1973) "Diffusion of Interstitial Impurities," in: "Diffusion," (American Society for Metals," Metals Park, Ohio) pp. 209–240.
Ghosh, M. K. and Mittal K. L. (1996) "Polyimides Fundamentals and Applications," (Marcel Dekker, Inc., New York, N.Y.).
Van der Merwe, J. H. (1984) "Recent Developments in the Theory of Epitaxy," in: "Chemistry and Physics of Solid Surfaces V," Edited by R. Vanselow and R. Howe, Springer-Verlag, Berlin, 1984) pp. 365–401.
Wilson, D., Stenzenberger, H. D., Hergenrother, P. M. (1990) "Polyimides," (Chapman & Hall New York, N.Y.).

All of the references cited herein are incorporated by reference herein in their entirety. These references are incorporated herein to provide details of prior art methods, techniques and materials which may be applied to or employed in combination with the methods, techniques and materials herein.

What is claimed is:

1. A hydrogen-permeable composite membrane for transport of hydrogen which is a cermet comprising a metal oxide and at least about 40% by volume of a hydrogen-permeable metal or alloy selected from the group consisting of V, Nb, Ta, Zr, and alloys thereof and which has a first surface for contacting hydrogen sink and a second surface for contacting a hydrogen source and wherein the first surface, the second surface or both are provided with a catalyst layer.

2. The composite membrane of claim 1 which comprises a hydrogen-permeable metal selected from the groups consisting of V, Nb, Ta, and Zr.

3. The composite membrane of claim 1 wherein the hydrogen-permeable metal is V.

4. The composite membrane of claim 1 wherein the hydrogen-permeable metal is Nb.

5. The composite membrane of claim 1 wherein the hydrogen-permeable metal is Ta.

6. The composite membrane of claim 1 wherein the hydrogen-permeable metal is Zr.

7. The composite membrane of claim 1 wherein the hydrogen-permeable metal or alloy is an alloy of V, Nb, Ta, or Zr.

8. The composite membrane of claim 7 wherein the hydrogen-permeable alloy is an alloy of one or more of the hydrogen-permeable metals V, Nb, Ta, and Zr in combination with one or more of Co, Fe, Rh, Ru, Pt, Mo, W, Ni, Al or Mg.

9. The composite membrane of claim 8 wherein the hydrogen-permeable alloy is an alloy of Zr and Ni.

10. The composite membrane of claim 8 wherein the hydrogen-permeable alloy is an alloy of V with Ni, Al or both.

11. The composite membrane of claim 8 wherein the hydrogen-permeable alloy is an alloy of Ta with Ni, Al or both.

12. The composite membrane of claim 1 wherein the metal oxide is selected from the group consisting of alumina, titania, zirconia or mixtures thereof.

13. The composite membrane of claim 1 wherein the metal oxide is alumina.

14. The composite membrane of claim 1 wherein the hydrogen-permeable metal is lattice matched to the metal oxide.

15. The composite membrane of claim 1 wherein the hydrogen-permeable metal is vanadium and the metal oxide is alumina.

16. The composite membrane of claim 1 wherein the hydrogen-permeable metal is vanadium and the metal oxide is alumina and wherein the composite membrane comprises about 40 vol % V and about 60 vol % alumina.

17. The composite membrane of claim 1 wherein the catalyst layer of the first or second surface is a layer of Pd, Pt, Ir, Ni, Co, Fe, Mo, W, Rh, Cu, Ag, or compounds or alloys thereof.

18. A membrane reactor for separating hydrogen from a mixture of gases which comprises a composite membrane of claim 1.

19. The hydrogen-permeable composite membrane of claim 1 which is in the form of a tube or a one-end-closed tube.

20. The hydrogen-permeable composite membrane of claim 1 wherein the catalyst layer is Co—Mo, $Fe_3O_4$ or combinations of $Fe_3O_4$ and $Cr_2O_3$.

21. A method for separating hydrogen from a mixture of gases which comprises the step of selectively transporting hydrogen through a membrane of claim 1 from a hydrogen source to a hydrogen sink.

22. A hydrogen-permeable composite membrane for transport of hydrogen which comprises a porous carrier and a substantially metallic layer blocking the pores of the carrier such that the membrane is rendered impermeable to gases other than hydrogen wherein the carrier is a metal, an alloy, or a refractory material and the metal of the metallic layer is lattice matched to the carrier material.

23. The composite membrane of claim 22 wherein the carrier is a refractory material made of a ceramic.

24. The hydrogen-permeable composite membrane of claim 23 wherein the substantially metallic layer is Pd or an alloy thereof.

25. The hydrogen-permeable composite membrane of claim 24 wherein the ceramic is $Fe_3O_4$ or MgO.

26. The composite membrane of claim 22 wherein the carrier is a metal.

27. The composite membrane of claim 26 wherein the metal of the carrier is not permeable to hydrogen.

28. The composite membrane of claim 27 wherein a hydrogen-permeable metal or metal alloy blocks the pores of the carrier.

29. The composite membrane of claim 26 wherein the metal or alloy of the carrier is hydrogen-permeable.

30. The composite membrane of claim 29 wherein a hydrogen-permeable metal or metal alloy blocks the pores of the carrier.

31. The composite membrane of claim 30 wherein the metal or alloy of the carrier is the same as the metal or alloy blocking the pores of the carrier.

32. The hydrogen-permeable composite membrane of claim 29 wherein the substantially metallic layer is a layer of a non-hydrogen-permeable metal or alloy.

33. The hydrogen-permeable composite membrane of claim 29 wherein the substantially metallic layer is a layer of a metal or alloy selected from Ni, Cu, Co, Fe, Mo, Ag, Pt and alloys thereof.

34. The hydrogen-permeable composite membrane of claim 33 wherein the carrier is a metal or alloy selected from V, Nb, Ta, Zr or alloys thereof.

35. The hydrogen-permeable composite membrane of claim 34 wherein the carrier is an alloy selected from alloys of one or more of V, Nb, Ta, Zr, with one or more of Co, Fe, Rh, Ru, Pt, Mo, W, Ni, Al, or Mg.

36. The hydrogen-permeable composite membrane of claim 26 wherein the carrier is a metal or alloy selected from V, Ta, Nb, Zr and alloys thereof and the substantially metallic layer is a layer of aluminum.

37. The composite membrane of claim 22 wherein the carrier is a refractory material selected from the group of refractory materials consisting of alumina, an aluminosilicate, cordite, a spinel, $MgAl_2O_4$, magnesium oxide, mullite, and a perovskite.

38. The composite membrane of claim 22 wherein the carrier is a refractory material which is a metal nitride, a metal boride or a metal carbide.

39. The composite membrane of claim 22 wherein the carrier is a metal or metal alloy selected from the group consisting of Fe, Mo, Co, Cr, V, Nb, Ta, Zr, or alloys thereof.

40. The composite membrane of claim 22 wherein the carrier is a refractory material which is a ceramic comprising a mixed metal oxide containing Co.

41. The membrane of claim 22 wherein the carrier is a porous ceramic having the formula:

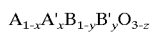

where A is La or a Lanthanide metal or combination thereof; A' is Na, K, Rb, Sr, Ca, Ba; or a combination thereof; B is a +3 or +4 metal cation of a heavy metal, a third row transition metal; a Group IIIb metal, or a combination thereof; B' is a metal that induces electronic conductivity, $0 \leq x \leq 1$; $0 \leq y \leq 1$; and z is a number that renders the composition charge neutral.

42. The membrane of claim 22 wherein the carrier is a porous ceramic having the formula:

where A is La or a Lanthanide metal or combination thereof; A' is Na, K, Rb, Sr, Ca, Ba; or a combination thereof; B is a +3 or +4 metal cation of a heavy metal, a third row transition metal, a Group IIIb metal, or a combination thereof; $x \leq 1$, $0 < y \leq 1$, and z is a number that renders the composition charge neutral.

43. The membrane of claim 42 wherein B is a combination of two first or second row metals and y is not 0.

44. The membrane of claim 43 wherein B is a combination of Co and another first or second row transition metal.

45. The membrane of claim 22 wherein the carrier material has the formula:

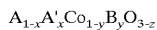

where A is La or a Lanthanide metal; A' is Sr, Ca, Ba, or combinations thereof and B is another transition metal ion; $0 < x < 1$; $0 \leq y < 1$; and z is a number that renders the composition charge neutral.

46. The composite membrane of claim 22 wherein the carrier material is selected from the groups consisting of LaFeO$_{3-z}$, LaCrO$_{3-z}$, mixtures of LaFe$_{1-y}$Cr$_y$O$_{3-z}$, BaTiO$_{3-z}$ CaTiO$_{3-z}$, and SrTiO$_{3-z}$, where 0>y>1 and z is a number that renders the compound charge neutral.

47. The composite membrane of claim 46 wherein the substantially metallic layer blocking the pores of the carrier is a layer of Pd or an alloy thereof.

48. The composite membrane of claim 22 wherein the substantially metallic layer blocking the pores of the carrier is a layer of a metal or alloy selected from the group consisting of V, Nb, Ta, Zr, Pd and alloys thereof.

49. The composite membrane of claim 48 wherein the carrier is alumina and the metal or alloy blocking the pores of the carrier is V, Nb, Zr, or an alloy thereof.

50. The composite membrane of claim 48 wherein the carrier is zirconia and the metal or alloy blocking the pores of the carrier is Zr or an alloy thereof.

51. The composite membrane of claim 22 wherein the substantially metallic layer blocking the pores of the carrier is a metal or alloy foil.

52. The composite membrane of claim 51 wherein the carrier is alumina.

53. The composite membrane of claim 51 wherein the metal or alloy foil is a foil of V, Nb, Ta, Zr or alloys thereof.

54. The composite membrane of claim 22 wherein the substantially metallic layer is a deposited layer of V, Nb, Ta or Zr.

55. A membrane reactor for separating hydrogen from a mixture of gases which comprises a composite membrane of claim 21.

56. The hydrogen-permeable composite membrane of claim 22 wherein the substantially metallic layer is a layer of Ta, Nb, V, Zr, Ni, Co, Fe, or Mo.

57. The hydrogen-permeable composite membrane of claim 22 which is in the form of a tube or a one-end-closed tube.

58. A method for separating hydrogen from a mixture of gases which comprises the step of selectively transporting hydrogen through a membrane of claim 22 from a hydrogen source to a hydrogen sink.

59. A hydrogen-permeable composite membrane for transport of hydrogen which comprises a porous carrier made of a first material the pores of which are blocked with a second material such that the membrane is rendered impermeable to gases other than hydrogen wherein the first material or the second material, but not both, is an organic resin and the other of the first or second materials, is a hydrogen-permeable metal or alloy.

60. The composite membrane of claim 59 wherein the porous carrier is an organic resin and the pores the carrier are blocked with a hydrogen-permeable metal or metal alloy.

61. The composite membrane of claim 60 wherein the hydrogen-permeable metal or metal alloy is selected from the group consisting of V, Nb, Ta, Zr, Pd or alloys thereof.

62. The membrane of claim 61 further comprising a catalyst layer on one or both surfaces of the membrane.

63. The membrane of claim 62 wherein the catalyst is Pd or an alloy thereof.

64. The membrane of claim 62 wherein the catalyst is a combination of Pd with Ag or Cu.

65. The composite membrane of claim 60 wherein the organic resin is a polyimide.

66. The composite membrane of claim 59 wherein the porous carrier is a hydrogen-permeable metal or metal alloy and the pores of the carrier are blocked with an organic resin.

67. The composite membrane of claim 66 wherein the hydrogen-permeable metal or metal alloy is selected from the group consisting of V, Nb, Ta, Zr, Pd or alloys thereof.

68. The composite membrane of claim 66 wherein the organic resin is a polyimide.

69. The composite membrane of claim 59 wherein the organic resin has a glass transition temperature of about 3000° C. or more.

70. The membrane of claim 59 wherein the carrier is a ceramic.

71. The membrane of claim 59 wherein the carrier is a porous refractory material.

72. The membrane of claim 59 wherein the carrier a metal nitride, a metal boride or a metal carbide.

73. The membrane of claim 59 wherein the carrier is alumina, cordite, a spinel, MgAl$_2$O$_4$, magnesium oxide, mullite, various alumino-silicates, a perovskite, clays, glass, organic polymers, or porcelains.

74. The membrane of claim 59 wherein the carrier is a perovskite.

75. The membrane of claim 59 wherein the carrier is a metal or metal alloy.

76. The membrane of claim 59 wherein the carrier is a ferrous metal or metal alloy thereof, molybdenum, cobalt, chromium, vanadium, niobium, tantalum, zirconium or alloys thereof.

77. The membrane of claim 59 wherein the carrier is a porous ceramic comprising a mixed metal oxide containing cobalt.

78. A membrane reactor for separating hydrogen from a mixture of gases which comprises a membrane of claim 59.

79. The hydrogen-permeable composite membrane of claim 59 which is in the form of a tube or a one-end-closed tube.

80. A method for separating hydrogen from a mixture of gases which comprises the step of selectively transporting hydrogen through a membrane of claim 59 from a hydrogen source to a hydrogen sink.

81. A hydrogen-permeable composite membrane for transport of hydrogen which comprises a porous carrier and a substantially metallic layer blocking the pores of the carrier such that the membrane is rendered impermeable to gases other than hydrogen wherein the carrier is a metal, an alloy, or a refractory material and the metallic layer is a metal or alloy foil.

82. The hydrogen-permeable composite membrane of claim 81 wherein the porous carrier comprises two layers of porous refractory material and the substantially metallic layer blocking the pores of the carrier is a metal or alloy foil between the two layers of porous refractory material.

83. The hydrogen-permeable composite membrane of claim 82 wherein the refractory material is a perovskite or a spinel.

84. The hydrogen-permeable composite membrane of claim 82 wherein the metal or alloy foil is a foil of V, Nb, Ta, Zr, or alloys thereof.

85. The hydrogen-permeable composite membrane of claim 84 wherein the refractory material comprises Co.

86. The hydrogen-permeable composite membrane of claim 81 which is in the form of a tube or a one-end-closed tube.

* * * * *